United States Patent
Dhanda et al.

(10) Patent No.: US 11,910,356 B2
(45) Date of Patent: Feb. 20, 2024

(54) COVERAGE-LEVEL-BASED PAGING CARRIER SELECTION TECHNIQUES

(71) Applicant: QUALCOMM Incorporated, San Diego, CA (US)

(72) Inventors: Mungal Singh Dhanda, Slough (GB); Umesh Phuyal, San Diego, CA (US); Alberto Rico Alvarino, San Diego, CA (US); Amer Catovic, San Diego, CA (US); Bharat Shrestha, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/444,599

(22) Filed: Aug. 6, 2021

(65) Prior Publication Data
US 2022/0046586 A1 Feb. 10, 2022

Related U.S. Application Data

(60) Provisional application No. 62/706,238, filed on Aug. 6, 2020.

(51) Int. Cl.
*H04W 68/02* (2009.01)
*H04W 48/18* (2009.01)

(52) U.S. Cl.
CPC ........... *H04W 68/02* (2013.01); *H04W 48/18* (2013.01)

(58) Field of Classification Search
CPC .............................. H04W 68/02; H04W 48/18

USPC ......................................................... 455/458
See application file for complete search history.

(56) References Cited

U.S. PATENT DOCUMENTS

| | | | |
|---|---|---|---|
| 2010/0272017 A1* | 10/2010 | Terry | H04W 48/12 370/328 |
| 2018/0160298 A1* | 6/2018 | Wang | H04M 7/006 |
| 2018/0242179 A1 | 8/2018 | Rathonyi et al. | |

FOREIGN PATENT DOCUMENTS

| | | |
|---|---|---|
| CN | 107734643 A | 2/2018 |
| EP | 3525518 A1 | 8/2019 |
| EP | 3634027 A1 | 4/2020 |
| GB | 2552838 A | 2/2018 |
| WO | 2018028576 A1 | 2/2018 |

OTHER PUBLICATIONS

International Search Report and Written Opinion—PCT/US2021/044952—ISA/EPO—dated Nov. 19, 2021.

\* cited by examiner

*Primary Examiner* — Joel Ajayi
(74) *Attorney, Agent, or Firm* — Haynes and Boone, LLP

(57) ABSTRACT

Wireless communications systems and methods related to coverage-level-based paging carrier selection are provided. In some aspects, a method of wireless communication performed by a user equipment includes receiving, from a base station, a first indication of one or more paging carriers, the first indication indicating for a paging carrier of the one or more paging carriers, a coverage level supported by the paging carrier; and receiving, from the base station, a paging message via the paging carrier based on a match between the coverage level supported by the paging carrier and a coverage level of the user equipment.

18 Claims, 14 Drawing Sheets

COVERAGE-LEVEL-BASED PAGING CARRIER SELECTION TECHNIQUES

CROSS-REFERENCE TO RELATED APPLICATIONS

The present application claims priority to and the benefit of the U.S. Provisional Patent Application No. 62/706,238, filed Aug. 6, 2020, titled "Coverage Level Based Paging Carrier Selection," which is hereby incorporated by reference in its entirety as if fully set forth below and for all applicable purposes.

TECHNICAL FIELD

This application relates to wireless communication systems, and more particularly to coverage-level-based paging carrier selection. Certain aspects can enable and provide techniques allowing a base station and/or a user equipment to select a paging carrier (e.g., based on a coverage level associated with the user equipment) for improved paging communications, reduced system overhead, richer device performance, and enhanced user experience.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

The improved latency, reliability, bandwidth, and/or throughput in NR enable various types of network deployments and/or services such as enhanced mobile broadband (eMBB), ultra-reliable, low-latency communication (URLLC), Internet of Things (IoT) communication, narrowband IoT (NB-IoT) communication, machine type communication (MTC), enhanced MTC (eMTC), and the like. The different types of communications may have different traffic requirements (e.g., latency, bandwidth, reliability, and/or throughput).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure provide improved paging for narrowband Internet of Things (NB-IoT) devices, enhanced MTC (eMTC) devices, and other wireless communication devices. For example, aspects of the present disclosure provide coverage-level-based paging carrier selection that can improve latency, reliability, efficiency, user satisfaction, and/or other parameters of paging communications in a wireless communication network. In some instances, different paging carriers are associated with one or more coverage levels. Use of multiple coverage levels, for example, enables selection of a paging carrier for a particular wireless communication device from among the paging carriers supporting the coverage level of the wireless communication device.

In some aspects, a method of wireless communication performed by a user equipment includes receiving, from a base station, a first indication of one or more paging carriers, the first indication indicating for a paging carrier of the one or more paging carriers, a coverage level supported by the paging carrier; and receiving, from the base station, a paging message via the paging carrier based on a match between the coverage level supported by the paging carrier and a coverage level of the user equipment.

In some aspects, a method of wireless communication performed by a base station includes transmitting, to a user equipment, a first indication of one or more paging carriers, the first indication indicating for a paging carrier of the one or more paging carriers, a coverage level supported by the paging carrier; and transmitting, to the user equipment, a paging message via the paging carrier based on a match between the coverage level supported by the paging carrier and a coverage level of the user equipment.

In some aspects, a user equipment includes a transceiver configured to receive, from a base station, a first indication of one or more paging carriers, the first indication indicating for a paging carrier of the one or more paging carriers, a coverage level supported by the paging carrier; and receive, from the base station, a paging message via the paging carrier based on a match between the coverage level supported by the paging carrier and a coverage level of the user equipment.

In some aspects, a base station includes a transceiver configured to transmit, to a user equipment, a first indication of one or more paging carriers, the first indication indicating for a paging carrier of the one or more paging carriers, a coverage level supported by the paging carrier; and transmit, to the user equipment, a paging message via the paging carrier based on a match between the coverage level supported by the paging carrier and a coverage level of the user equipment.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
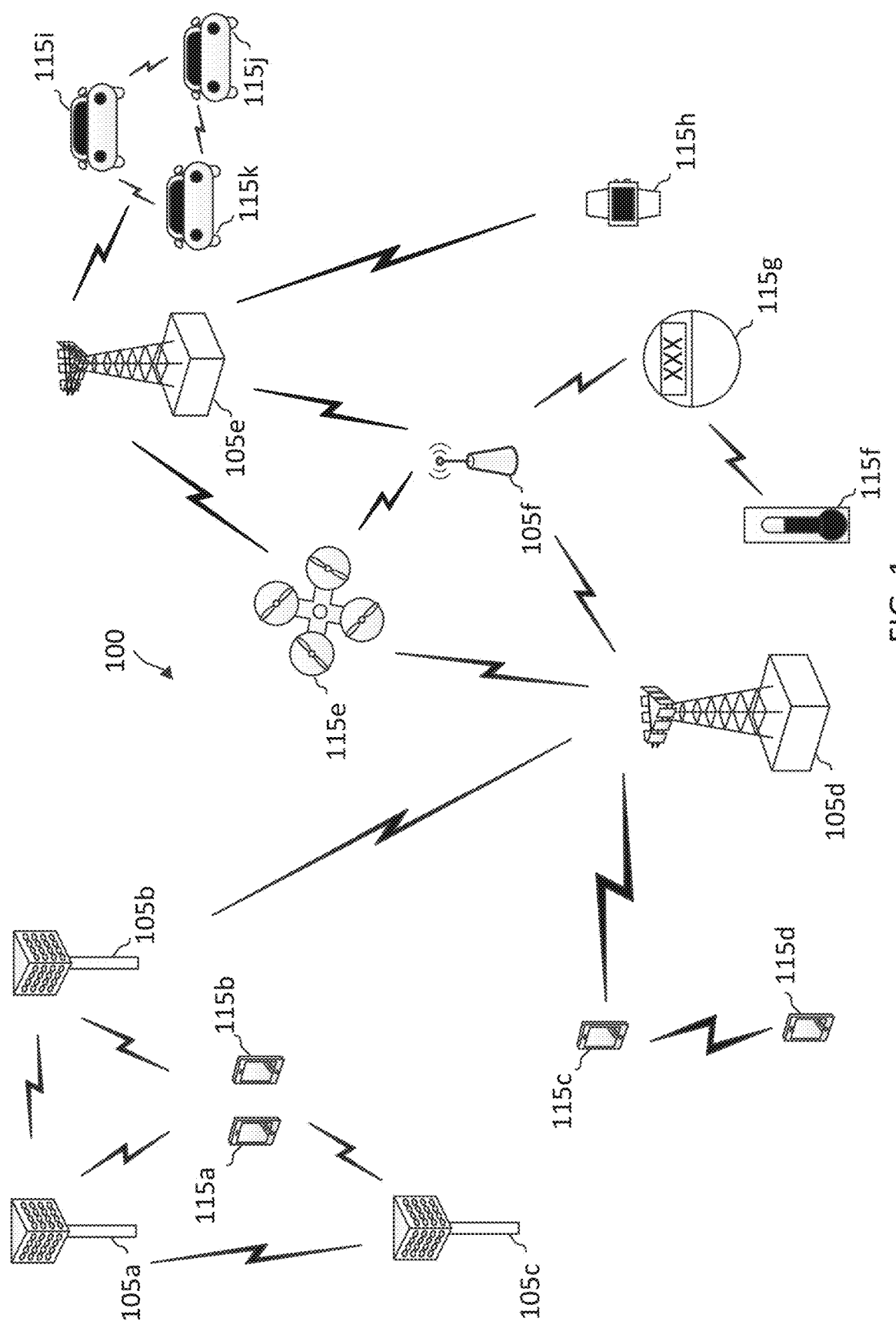
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Some 5G NR networks may have a variety of features and/or operating characteristics. For example, some deployments may be implemented to use optimized OFDM-based waveforms with scalable numerology and transmission time interval (TTI). Additionally or alternatively, some deployments may include a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In some instances, for narrowband Internet of Things (NB-IoT) communications and enhanced MTC (eMTC) communications more than one paging carrier can be supported in a cell. For example, paging carrier as used in the present disclosure can include NB-IoT paging carrier, eMTC paging narrowband, and/or other types of paging carrier. A deterministic method can be defined to select one paging carrier for a UE from the set of paging carriers supported in a cell. In some instances, the same paging carriers are available for use by any of the UEs in a cell, regardless of the coverage level of a UE. This can result in UEs in better coverage areas (e.g., NB-IOT devices in coverage level 1 and/or eMTC devices in coverage enhancement (CE) mode A) and UEs in extreme or worse coverage areas (e.g., NB-IOT devices in coverage level 3 and/or eMTC devices in CE mode B) sharing the same paging carrier. Likewise, UEs with a higher or prioritized service level and UEs with a lower or subservient service level may share the same paging carrier. As a result, the UEs in the better coverage areas and/or with high/prioritized service level may have a paging delay—despite having good coverage and/or a high/prioritized service level—as repetitions are applied to paging message transmissions to page UEs in worse coverage areas and/or UEs having a lower/subservient service level but that are using the same paging carrier. This can cause inefficient use of network resources, poor latency, unwanted delays, and/or user dissatisfaction.

Aspects of the present disclosure can provide improved paging techniques. These techniques may be used for many types of communication networks and devices. Several particular samples include, but are not limited to, NB-IoT devices, eMTC devices, reduced capability devices, and other wireless communication devices. Paging-technique aspects of the present disclosure provide coverage-level-based paging carrier selection for communication between the devices and the communication networks over a wireless channel. In some aspects, the coverage-level-based paging carrier selection includes a UE selecting a paging carrier, from a plurality of paging carriers, based on a value of the coverage level of the UE, where each paging carrier of the plurality of paging carriers is associated with one or more coverage levels corresponding to conditions of the wireless channel as measured by, for instance, reference signal receive power (RSRP) values, etc. Deployments and use of techniques discussed herein can improve latency, reliability, efficiency, user satisfaction, and/or other parameters of paging communications in a wireless communication network.

Paging techniques discussed herein may include paging carrier and/or coverage level aspects. In some instances, different paging carriers can be associated with one or more coverage levels. Associating coverage levels enables a paging carrier for a particular wireless communication device to be selected from among paging carriers supporting the coverage level of the wireless communication device. This can provide improved paging performance for UEs in better coverage areas.

Coverage levels, alternatively referred to as coverage enhancement (CE) levels or CE modes, refer to multiple levels or modes defined for CE operations of a UE. CE operations are modes of UE operations designed or configured for environments or situations that may pose challenging coverage conditions (e.g., high path loss) for the network and/or the UE, non-limiting examples of which include eMTC or NB-IoT devices in places that are difficult for network signals to reach such as basements. CE may be achieved via repetition techniques, where when a UE is operating in CE modes, transmissions may be repeated multiple (e.g., from tens to thousands of) times to improve the chances that the transmissions are successful (e.g., which is in contrast to standard LTE/5G operations where transmissions are in general transmitted once or very limited number of times). For eMTC devices, two CE modes have been defined, mode A and mode B, where the former is designed for moderate coverage conditions and the latter is designed for extreme coverage conditions. For NB-IoT devices, three CE levels have been defined, CE level 1, 2, and 3 corresponding respectively to good, medium, and poor coverage conditions.

The CE modes and/or the CE levels may be defined based on measures that are related to path loss or in general the conditions of the wireless channel, such as but not limited to CINR, signal-to-interference-plus-noise ratio (SINR), reference signal received power (RSRP), etc. For example, mode B has been defined for carrier-to-interference-and-noise ratio (CINR)<−6 dB to −18 dB) while mode A has been defined for higher CINR values. As another example, the highest RSRP values for a UE may be associated with the lowest CE level, CE level 1 (alternatively referred to as CL1 for coverage level 1), while the lowest RSRP values for a UE may be associated with the lowest CE level, CE level 3 (alternatively referred to as CL3 for coverage level 3), with medium RSRP values for a UE associated with CE level 2 (alternatively referred to as CE level CL2 for coverage level 2). The UE may measure its downlink received signal power to determine the CE level to which it belongs.

Different number of transmission repetitions may be assigned to different CE modes or levels, with CE modes or levels that are associated with poor or challenging coverage conditions or high path loss being assigned increased number of transmission repetitions compared to those modes associated with better coverage conditions. For example, in LTE, mode A may be associated with no or few repetitions for PRACH while mode B may be associated with medium or large number of repetitions for PRACH. Similarly, the number of transmission repetitions assigned to CL3 may be larger than that of CL2 which may be larger than that of CL1. Further, the different CE modes or levels may also be characterized by other parameters such as but not limited to PRACH resources, starting time, frequency location, number of subcarriers, etc., of the transmissions. It is to be understood that the above CE mode/level definitions are non-limiting illustrative examples, and that any number of modes/levels can be defined, and associated number of transmission repetitions may be assigned to the CE modes or levels to improve the chances transmissions are successful at that mode/level.

Paging performance improvements may be brought about by using coverage level considerations in paging operations. For example, if there are many UEs in a cell with good coverage (e.g., smart meters or other NB-IoT/eMTC devices that are stationary and tend to maintain a consistent coverage level), then these UEs can benefit from using one or more paging carriers set aside for UEs with good coverage (e.g., NB-IoT devices in coverage level 1 and/or eMTC devices in coverage enhancement (CE) mode A). Additionally or alternatively, these UEs can avoiding delays associated with paging (or attempting to page) UEs with worse coverage (e.g., NB-IoT devices in coverage level 3 and/or eMTC devices in CE mode B).

Additional coverage level features bring about improved paging operations. Some aspects of the present disclosure can provide mechanisms to identify which coverage level(s) are supported by each paging carrier. Additionally or alternatively, some aspects of the present disclosure can also provide mechanisms for a UE and/or a BS to select a paging carrier for the UE based on the coverage level of the UE and/or other parameters (e.g., DRX cycle, service level, etc.).

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. The core network may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network. User IP packets may be transferred through the user plane entity, which may provide IP address allocation as well as other functions. The user plane entity may be connected to the network operators IP services. The operators IP services may include access to the Internet, Intranet(s), an IP Multimedia Subsystem (IMS), or a Packet-Switched Streaming Service. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as a message 1 (MSG 1), a message 2 (MSG 2), a message 3 (MSG 3), and a message 4 (MSG 4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115. A registration area may have one or more tracking areas. A tracking area may have one or more cells. Additionally, a tracking area identity (TAI) is an identifier that is used to track tracking areas. The TAI may be constructed from the PLMN identity to which the tracking area belongs and the tracking area code (TAC) of the tracking area.

In an embodiment, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the component carrier to a UE 115 for UL and DL communications. For example, the BWP pair may include one BWP for UL communications and one BWP for DL communications.

In an embodiment, when there is no ongoing data transmission between a UE 115 and the network 100, the UE 115 may enter an idle mode, for example, to save power at the UE 115. While the UE 115 is in the idle mode, the UE 115 may monitor for paging messages from the network 100, for example, at predetermined time configured by the network 100, and may be in a sleep mode at other times to preserve power. For instance, the BS 105 may configure the UE 115 to operate in a DRX cycle including an on-duration and an off-duration. The UE 115 may monitor for paging messages from the BS 105 during the on-duration of the DRX cycle. The BS 105 may page the UE 115 during the on-duration of the DRX cycle. In some aspects, the UE 115 is an NB-IoT device, an eMTC device, or any other wireless communication devices that operate over a narrowband, and the network 100 may utilize multiple paging carriers for paging the UEs 115 in the network 100. Different paging carriers can be associated with different coverage levels and/or different DRX cycles. The BS 105 and/or the UE 115 may select a paging carrier based on a coverage level of the UE 115 and/or a DRX cycle of the UE 115 for paging message communications. Mechanisms for coverage-level-based paging communications are described in greater detail herein.

Figure 2:
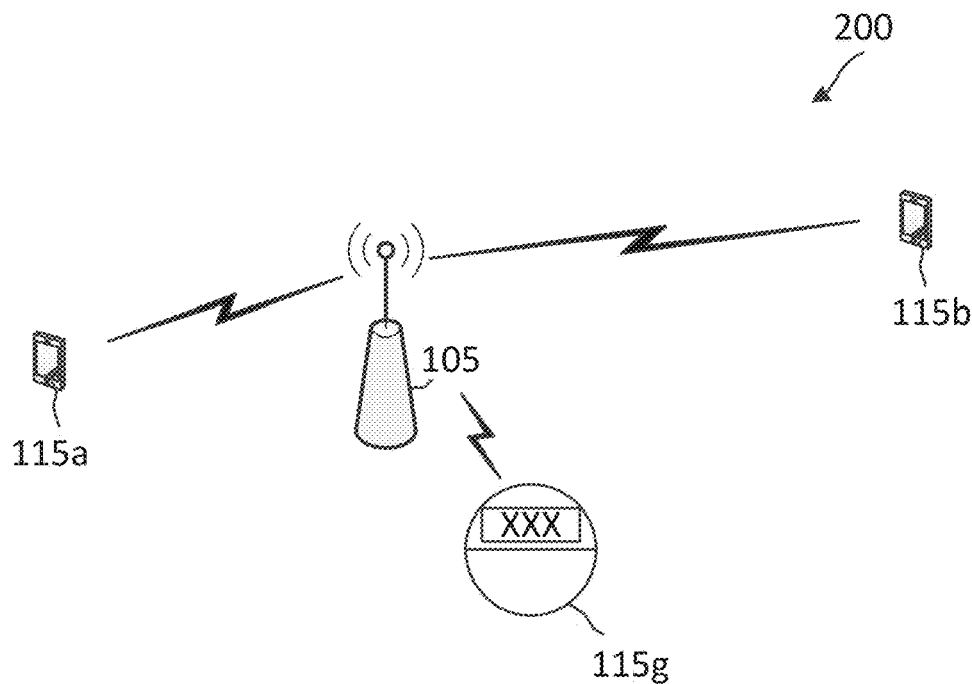
FIG. 2 illustrates a wireless communication network according to some aspects of the present disclosure.

FIG. 2 illustrates a wireless communication network 200 according to some aspects of the present disclosure. The BS 105 may provide different coverage levels to UEs (e.g., UE 115*a*, 115*b*, and 115*g*) in the cell. The coverage level of a particular UE may be dependent on a proximity to the BS, environmental factors (e.g., obstructions, interference, etc.), operating parameters of the UE (e.g., available transmit power, battery level, service level, etc.), or other factors. In some instances, between two and sixty-four different coverage levels may be defined, with two, three, four, five, six, seven, eight, nine, ten, etc. coverage levels being used in some instances. In some cases, a deterministic algorithm or formula may be utilized to determine the coverage level for a UE. In some instances, the deterministic algorithm/formula for determining a coverage level utilizes such factors as a reference signal receive power (RSRP), narrow-band physical random access channel (NPRACH) thresholds (e.g., for NB-IoT devices), physical random access channel (PRACH) thresholds (e.g., for eMTC devices), network coverage restrictions, discontinuous reception (DRX) cycle lengths, UE identification number, and/or other factors. In some instances, UEs 115*a*, 115*b*, and 115*g* are in different coverage levels (e.g. UE 115*g* in coverage level 1, UE 115*a* in coverage level 2, and UE 115*b* in coverage level 3).

In some aspects of the present disclosure, a paging-specific coverage level determination can be made. In some instances, the coverage level for a particular UE (e.g., UE 115a, 115b, or 115g) may be determined using a paging-specific coverage level algorithm/formula that is different from other coverage level algorithms/formulas. In this manner, the coverage levels for paging may be different from the other coverage levels and tailored to provide the best network performance for paging. For example, a list of RSRP thresholds associated with different paging coverage levels may be provided as: RSRP-ThresholdsPCCH-InfoList-NB-r17::=SEQUENCE (SIZE(1 . . . k)) OF RSRP-Range where each entry in the sequence corresponds to a boundary of a coverage level and k is a positive integer greater than 1 (and may be different than the number of entries for NPRACH). In some instances, the paging-specific coverage level algorithm/formula does not take into account or utilize UE transmit power capabilities in determining the coverage level since the reception capability of the UE is not impacted by the maximum transmit power supported by the UE.

In some aspects, the coverage level of a UE for paging purposes can be determined based on a coverage level algorithm/formula used for other purposes (e.g., unrelated to paging). For example, existing coverage level determinations for NB-IoT devices (e.g., NPRACH coverage levels 1, 2, and/or 3) and/or eMTC devices (PRACH coverage enhancement (CE) mode A and/or B) may be used. For example, for NB-IoT devices a list of RSRP thresholds associated with different NPRACH coverage levels may be provided as: RSRP-ThresholdsNPRACH-InfoList-NB-r13::= SEQUENCE (SIZE(1 . . . 2)) OF RSRP-Range where each entry in the sequence corresponds to a boundary of a coverage level. Thus, in the provided example with two entries, three different coverage levels can be defined (e.g., values greater than the first entry, values between the first and second entries, and values less than the second entry). For UEs with a lower maximum transmit power (e.g., a UE with maximum transmit power of ~14 dBm or less) the measured RSRP may be adjusted to take into account that the UE has a lower transmit power and may require more repetitions than a UE supporting a higher maximum transmit power (e.g., a UE with maximum transmit power of ~20 dBm or more). This can result in a lower power UE being determined to be in worse coverage level (e.g., coverage level 3) than a higher power UE with the same measured RSRP being determined to be in a better coverage level (e.g., coverage level 2).

Figure 3:
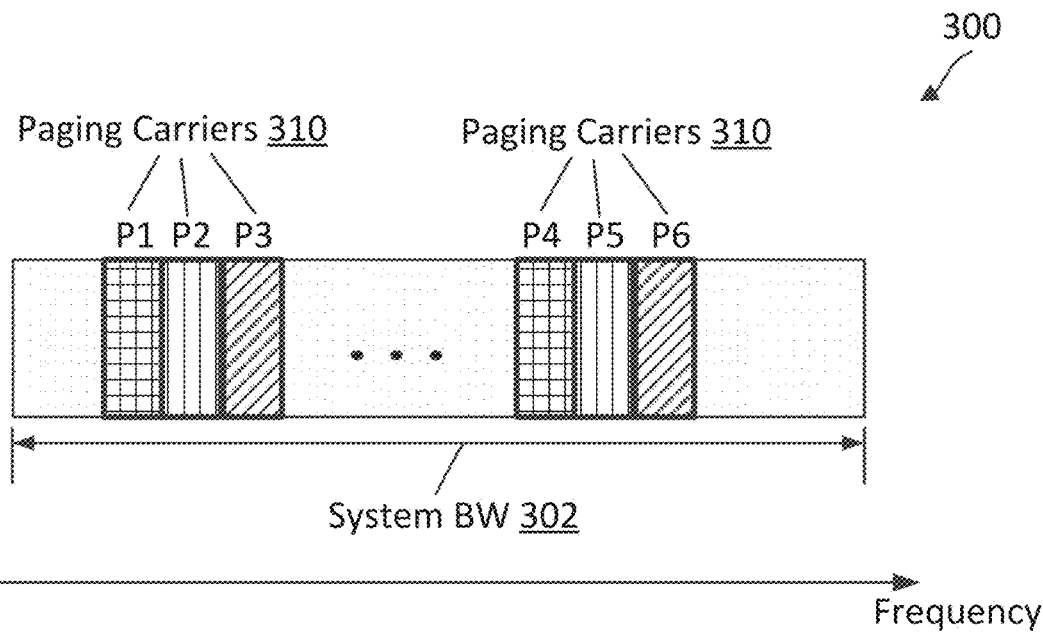
FIG. 3 illustrates an association of coverage levels to paging carriers according to some aspects of the present disclosure.

FIG. 3 illustrates an association 300 of coverage levels to paging carriers according to some aspects of the present disclosure. As shown, a system bandwidth 302 can include a number of paging carriers 310 (e.g., P1, P2, P3, P4, P5, P6). Each of the paging carriers 310 occupies a frequency range of the system bandwidth 302. The paging carriers 310 may occupy adjacent portions of the system bandwidth 302 (e.g., P1 and P2), be spaced apart from one another across the system bandwidth 302 (e.g., P3 and P4), and/or combinations thereof. In some instances, each paging carrier 310 occupies the same frequency band size. In other instances, one or more of the paging carriers 310 occupies a different frequency band size than one or more of the other paging carriers (e.g., occupies a larger or smaller frequency band).

As shown in FIG. 3, each of the paging carriers 310 is associated with one or more coverage levels. In particular, some of the paging carriers 310 (e.g., P1 and P4) are associated with coverage level 1, some of the paging carriers 310 (e.g., P2 and P5) are associated with coverage level 2, and some of the paging carriers 310 (e.g., P3 and P6) are associated with coverage level 3. As discussed above, greater (or fewer) coverage levels may be provided and associated with the paging carriers 310. In some instances, each available coverage level is associated with at least one paging carrier 310. In some instances, a paging carrier 310 supports only one associated coverage level (e.g., P1 supports coverage level 1, P2 supports coverage level 2, P3 supports coverage level 3, etc.). In some instances, additionally or alternatively, a paging carrier 310 supports one or more coverage levels. For example, each paging carrier 310 may support an associated or assigned coverage level and any coverage levels better than the associated/assigned coverage level (e.g., P1 supports coverage level 1, P2 supports coverage levels 1 and 2, P3 supports coverage levels 1, 2, and 3). Similarly, each paging carrier 310 may support one or more coverage level(s) specifically associated or assigned to the paging carrier 310, not necessarily including coverage level(s) better than the associated/assigned coverage level(s). As discussed below with respect to FIGS. 4-7, aspects of the present disclosure provide mechanisms for indicating which coverage level(s) are associated with or assigned to the different paging carriers 310 (e.g., P1, P2, P3, P4, P5, P6, etc.) of a cell.

Figure 4:
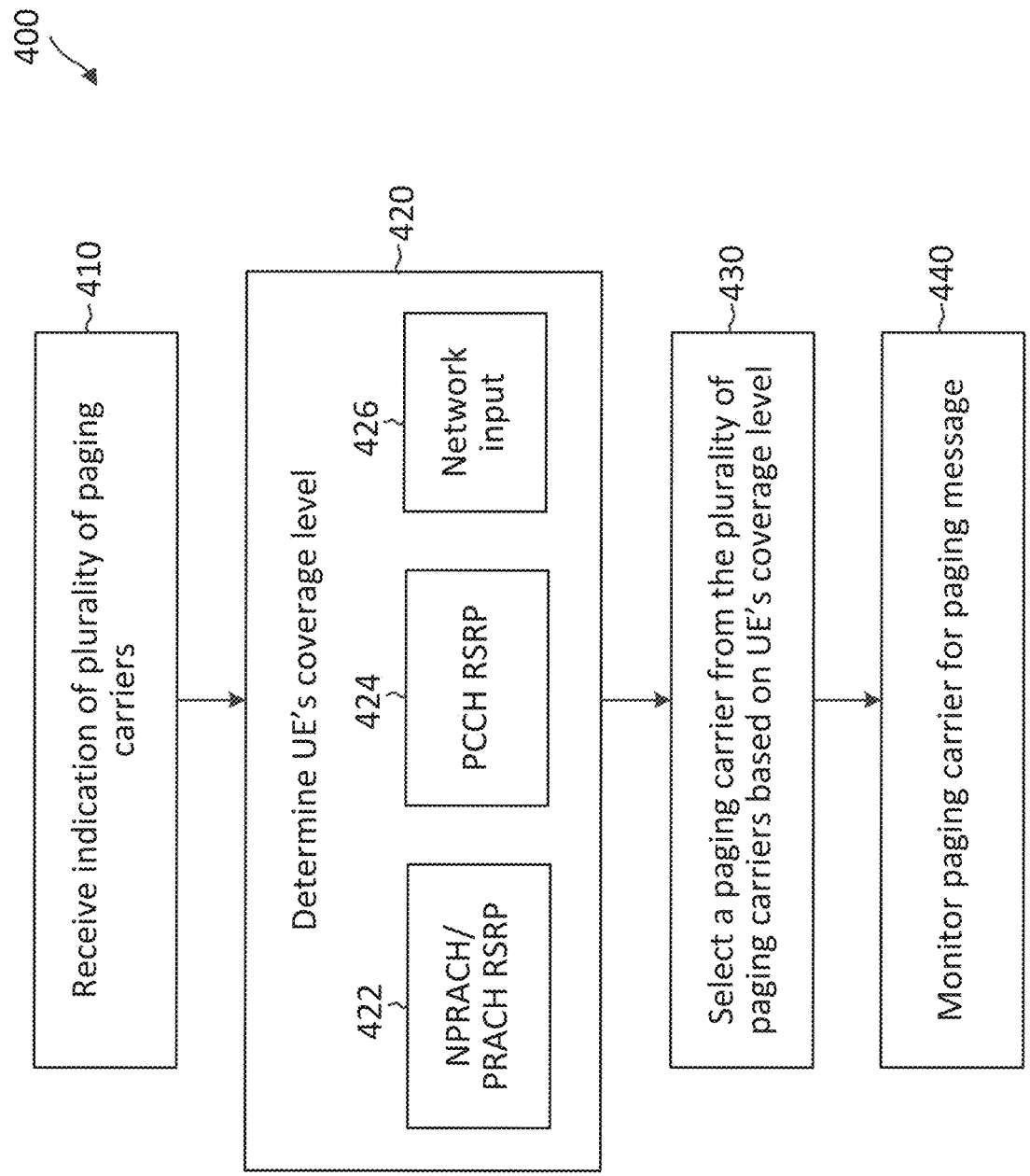
FIG. 4 is a flow diagram illustrating a coverage-level-based paging communication method according to some aspects of the present disclosure.

FIG. 4 is a flow diagram illustrating a coverage-level-based paging communication method 400 according to some aspects of the present disclosure. Aspects of the method 400 can be executed by a computing device (e.g., a processor, processing circuit, and/or other suitable component) of a wireless communication device (e.g., a UE 115) or other suitable means for performing the steps. As illustrated, the method 400 includes a number of enumerated aspects, but the method 400 may include additional steps before, after, and in between the enumerated aspects. In some instances, one or more of the enumerated aspects may be omitted or performed in a different order.

At block 410, the UE (e.g., UE 115) can receive an indication of plurality of paging carriers. The indication may contain one or more dynamic information elements configured to indicate a variety of operational parameters. In some deployments, the UE can be a narrow-band internet of things (NB-IoT) device, an enhanced machine-type communication (eMTC) device, or other wireless communication device. The UE can receive the indication of the plurality of paging carriers for a cell from a BS (e.g., BS 105). In some instances, the indication received from the BS indicates one or more paging coverage level(s) for each of the plurality of paging carriers of a cell (e.g., as discussed above with respect to FIG. 3). In some aspects, the paging coverage level for each of the plurality of paging carriers includes one or more paging coverage levels. The indication may also include one or more values to indicate the paging coverage level(s) supported by a paging carrier, as discussed below with respect to FIGS. 5-7. In some instances, the indication includes a bit for each paging coverage level to indicate whether each paging coverage level is supported or not supported by the paging carrier, as discussed below with respect to FIG. 6. In some instances, each paging carrier supports a single paging coverage level. In some aspects, the UE receives the indication from the BS via a system information block (SIB) (e.g., SIB2-NB (e.g., for an anchor carrier), SIB22-NB (e.g., for a non-anchor carrier), SIB24-NB, or other suitable SIB), a downlink common configuration message, and/or a paging control channel (PCCH) configuration message.

In some instances, the UE receives the indication of the plurality of paging carriers by receiving an information element of a message that indicates the coverage level based on the value of the information element. For example, where each coverage level corresponds to an RSRP threshold in RSRP-ThresholdsNPRACH-InfoList-NB-r13 (having three coverage levels), the indication can be provided by the following information element or similar indication: [[pcch-CoverageLevel-r17 ENUMERATED CL1, CL2]]. Accordingly, the indications can be CL1 for coverage level 1, CL2 for coverage level 2, and no indication for coverage level 3 (or alternatively CL3 for coverage level 3). As another example, where each coverage level corresponds to an RSRP threshold in RSRP-ThresholdsPCCH-InfoList-NB-r17 (having a predefined number of paging coverage levels) or other paging-specific threshold determination, the indication can be provided by the following information element or similar indication: [[pcch-CoverageLevel-r17 ENUMERATED PAGE-CL1, PAGE-CL2,]]. Accordingly, the indications can be PAGE-CL1 for coverage level 1, PAGE-CL2 for coverage level 2, and so on. No indication may be provided for coverage level k (or alternatively PAGE-CLk can be indicated for coverage level k).

To allow aspects of the present disclosure to be backward compatible with legacy UEs that may not be configured for coverage-level-based paging carrier selection, at least one paging carrier of the plurality of paging carriers (e.g., an anchor carrier or other suitable carrier) may be configured to support all coverage levels. Further, a paging carrier list with supported coverage levels may be provided (e.g., via a SIB24-NB) to indicate the coverage levels supported by the paging carriers to the coverage-level-based paging-carrier-selection-capable UEs. For example, the paging carrier list may be provided as: dl-ConfigList-r17 DL-ConfigCommon-List-NB-r17 OPTIONAL, —Need OR
where:

legacy UEs as the legacy UEs will not understand the information element. However, coverage-level-based paging carrier selection enabled UEs (e.g., release 17 UEs) can understand the PCCH-Config-NB-r17 information element. Accordingly, in some instances the 'COND PCCH-COVERAGE' field is provided to indicate that the PCCH-Config-NB-r17 information element may be included if and only if PCCH-Config-NB-r14 is included in DL-ConfigCommon-NB-r17 (e.g., the new paging carrier list).

While the provided coding indication examples above show coverage levels corresponding to NPRACH RSRP thresholds, the same or a similar indication types can be used for the other coverage level approaches specifically discussed herein as well as any other suitable coverage level determinations.

At block 420, the UE determines its coverage level. As shown, the UE may determine its coverage level and select a paging carrier based on one or more of a NPRACH/PRACH RSRP 422, a PCCH RSRP 424, network input 426, and/or other factors.

In some aspects, as indicated by block 422, the UE determines its coverage level based on a narrow-band physical random access channel (NPRACH) threshold and a reference signal receive power (RSRP) (e.g., for a NB-IoT

```
DL-ConfigCommon-NB-r17 ::= SEQUENCE {
              dl-CarrierConfig-r17 DL-CarrierConfigCommon-NB-r14,
              pcch-Config-r17 PCCH-Config-NB-r14 OPTIONAL, -- Need OR,
              wus-Config-r17 WUS-ConfigPerCarrier-NB-r15 OPTIONAL, -- Cond
WUS
              gwus-Config-r17 CHOICE {
                          useWUS-r16 NULL,
                          explicit-r16 WUS-ConfigPerCarrier-NB-r15
                    } OPTIONAL, -- Cond GWUS
              pcch-CoverageLevel-r17 ENUMERATED { CL1, CL2 }
      }.
```

In some instances, the paging carrier list may be provided by adding pcch-CoverageLevel-r17 to PCCH-Config-NB-r14 as follows:

device). For example, the UE may determine the coverage level based on: RSRP-ThresholdsNPRACH-InfoList-NB-r13::=SEQUENCE (SIZE(1 . . . 2)) OF RSRP-Range.

```
DL-ConfigCommon-NB-r17 ::= SEQUENCE {
              dl-CarrierConfig-r17 DL-CarrierConfigCommon-NB-r14,
              pcch-Config-r17 PCCH-Config-NB-r14 OPTIONAL, -- Need OR,
              wus-Config-r17 WUS-ConfigPerCarrier-NB-r15 OPTIONAL, -- Cond
WUS
              gwus-Config-r17 CHOICE {
                          useWUS-r16 NULL,
                          explicit-r16 WUS-ConfigPerCarrier-NB-r15
                    } OPTIONAL, -- Cond GWUS
       }
PCCH-Config-NB-r14 ::= SEQUENCE {
             npdcch-NumRepetitionPaging-r14 ENUMERATED {r1, r2, r4, r8, r16,
r32, r64, r128,r256, r512, r1024, r2048, spare4, spare3, spare2, spare1} OPTIONAL, --Need
OP
       pagingWeight-r14     PagingWeight-NB-r14      DEFAULT w1,
       ...
       pcch-CoverageLevel-r17 ENUMERATED { CL1, CL2 } OPTIONAL, -- COND
PCCH-COVERAGE
       }.
```

Because PCCH-Config-NB-r14 can be used both within legacy paging carrier list (DL-ConfigCommon-NB-r14) and new paging carrier list (DL-ConfigCommon-NB-r17), pcch-CoverageLevel-r17 may only be present in an instance of PCCH-Config-NB-r14 if the instance occurs in DL-Config-Common-NB-r17. If an instance of PCCH-Config-NB-r17 occurs in DL-ConfigCommon-NB-r14 (e.g., the legacy carrier list) then the PCCH-Config-NB-r17 can be ignored by In some aspects, as indicated by block 422, the UE determines the coverage level based on a physical random access channel (PRACH) threshold and a reference signal receive power (RSRP) (e.g., for a eMTC device). For example, the UE may determine the coverage level based on determining a CE mode for eMTC devices.

In some aspects, as indicated by block 424, the UE determines the coverage level based on a paging (e.g. paging control channel (PCCH)) threshold and a reference signal receive power (RSRP). For example, the UE may determine the coverage level based on: RSRP-ThresholdsPCCH-Info-List-NB-r17::=SEQUENCE (SIZE(1 . . . k)) OF RSRP-Range.

In some aspects, as indicated by block 426, UEs can determine a coverage level. These determinations can be based on a number of factors or considerations. For example, in some particular deployments, these determinations can be based on a coverage restriction of the UE and/or other network input. Additionally or alternatively, a UE may be configured (e.g., by a network) to restrict its coverage level to one or more coverage levels. For example, the UE may be configured to operate in coverage level 1 only. Should the UE go out of coverage level 1 (e.g., to coverage level 2 or 3), then the UE may go out of service until it returns to coverage level 1 (in the same or a different cell). In some instances, legacy coverage level restriction mechanisms may be used for paging carrier selection restrictions as well. For example, a BS can broadcast information to restrict the RxLevel up to which a UE configured with a restricted coverage level can consider the cell and/or coverage level suitable. In some instances, the BS and/or core network configure the UE with a coverage level for paging carrier selection. In some instances, the UE may determine its coverage level by receiving an indication of its coverage level from the BS and/or core network.

Network components (such as base stations) may also be involved in coverage level determinations or operations. For example, in some instances, the BS determines the coverage level of the UE in a similar fashion to the UE (e.g., using the same or similar parameters in the context of the same or similar algorithms). In some instances, the BS receives an indication of the coverage level of the UE from the UE. In some instances, the BS or an associated core network determines one or more coverage level restrictions for the UE based on service level of the UE, operating parameters/features of the UE, network traffic levels, and/or other aspects of the UE and/or network.

At block 430, the UE selects a paging carrier from the plurality of paging carriers based on its coverage level (as determined at block 420). In some instances, the UE identifies a subset of the plurality of paging carriers supporting the coverage level of the UE and selects a particular paging carrier from the subset of paging carriers supporting the coverage level of the UE. For example, referring again to FIG. 3, if the UE determines, at block 420, its coverage level is a coverage level 1, then the UE may select paging carrier P1 or P4 from the paging carriers 310 since paging carriers P1 and P4 support coverage level 1. That is, in some instances, the UE may select the paging carrier (e.g., P1 or P4) with a coverage level (e.g., coverage level 1) that matches the coverage level of the UE (e.g., coverage level 1). And in some cases, the UE may then use the selected paging carrier for receiving a paging message from the base station. In some instances, the UE follows a legacy paging carrier selection scheme to select among the paging carriers supporting its coverage level. For instance, in the legacy paging carrier selection scheme, the BS may configure the UE with a weighting factor (e.g., related to paging load distribution among the paging carriers) for selecting a paging carrier from among paging carriers. Paging carrier selection may be based on a number of factors or considerations. In some deployments, the BS and/or UE may select a paging carrier based at least in part on the UE identifier (ID) and the paging weight factor. Other non-limiting examples of the different factors or considerations for determining, selecting or assigning a paging carrier for a UE include carrier power boost information (e.g., downlink power boosting applied for a carrier), whether a carrier is a non-anchor or anchor carrier, whether a carrier is in-band, guard-band or stand-alone, UE category/capability (e.g., uplink and downlink transmission reception capability), a history of the UE (e.g., type of service UE typically requires), UE differentiation information (e.g., battery indication, traffic profile, stationary indication, periodical communication pattern, etc.), a current load situation on downlink carriers, a current distribution of one or more UEs over carriers, and/or the like.

As illustrated, in some aspects, a UE can select a paging carrier based on UE operations. As shown, at block 430, paging carrier selection can be based on a discontinuous reception (DRX) cycle of the UE. The DRX cycle of the UE may be configured or assigned to the UE by the BS. In some aspects, the UE receives, from the BS, an indication of one or more DRX cycle length(s) supported by each of the plurality of paging carriers. The indication of the DRX cycle length(s) may be received by the UE as part of the indication of the plurality of paging carriers (received at block 410) or received as a separate indication. In some instances, to reduce the paging delay for UEs in a better coverage level (e.g., coverage level 1 and/or CE mode A) it can be beneficial to set a different paging DRX cycle for the paging carriers supporting the better coverage level. Accordingly, in some instances the following information element or a similar information element can be included in each paging carrier configuration so a paging carrier specific DRX cycle can be configured: cl-SpecificPagingCycle-r17 ENUMERATED {rf32, rf64, rf128, rf256, rf512, rf1024}. In this manner, the UE can identify the paging carriers that support both the UE's coverage level as well as the UE's DRX cycle and select a corresponding paging carrier. In some instances, a paging carrier that supports a DRX cycle of the UE may have a DRX cycle with on-duration at about the same time as the on-duration of the UE's DRX cycle.

At block 440, the UE can monitor, the paging carrier selected at block 430, for a paging message from the base station. For example, the UE may tune the receiver chain of its transceiver unit (e.g., transceiver 1310 in FIG. 13) to the paging carrier in search of a paging message from the base station.

Figure 5:
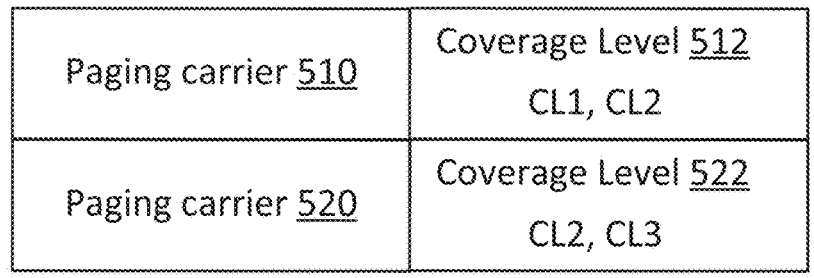
FIG. 5 illustrates an association of coverage levels to paging carriers according to some aspects of the present disclosure.

FIG. 5 illustrates an association 500 of coverage levels to paging carriers according to some aspects of the present disclosure. The association 500 illustrates an example of an indication of one or more paging coverage level(s) for each of a plurality of paging carriers of a cell (e.g., as discussed above with respect to FIGS. 3 and 4). In particular, the example of FIG. 5 illustrates an explicit indication of each coverage level supported by a paging carrier. For example, the association 500 shows a paging carrier 510 can be associated with a coverage level 512 that includes coverage levels 1 and 2, as indicated by CL1 and CL2. The association 500 also shows a paging carrier 520 can be associated with a coverage level 522 that includes coverage levels 2 and 3, as indicated by CL2 and CL3. Accordingly, paging carrier 510 supports coverage levels 1 and 2 (and does not support coverage level 3), while paging carrier 520 supports coverage levels 2 and 3 (and does not support coverage level 1). In some aspects, the association 500 may be encoded as: [[pcch-CoverageLevel-r17 ENUMERATED {CL1, CL2}]].

Figure 6:
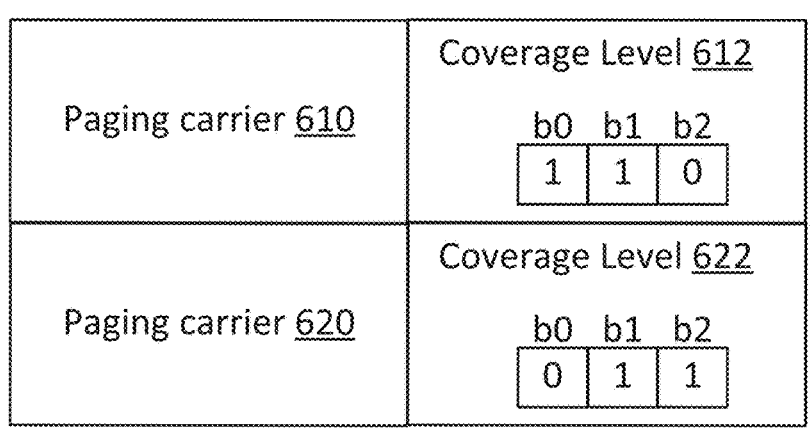
FIG. 6 illustrates an association of coverage levels to paging carriers according to some aspects of the present disclosure.

FIG. 6 illustrates an association 600 of coverage levels to paging carriers according to some aspects of the present disclosure. The association 600 illustrates an example of an indication of one or more paging coverage level(s) for each of a plurality of paging carriers of a cell (e.g., as discussed above with respect to FIGS. 3 and 4). In particular, the example of FIG. 6 illustrates an explicit indication of each coverage level supported by a paging carrier via an associated bit. For example, the association 600 shows a paging carrier 610 can be associated with a coverage level 612 that includes coverage levels 1 and 2, as indicated by bits b0 and b1 being set to one and bit b2 being set to zero. The association 600 also shows a paging carrier 620 can be associated with a coverage level 622 that includes coverage levels 2 and 3, as indicated by bits b1 and b2 being set to one and bit b0 being set to zero. Accordingly, paging carrier 610 supports coverage levels 1 and 2 (and does not support coverage level 3), while paging carrier 620 supports coverage levels 2 and 3 (and does not support coverage level 1). In some aspects, the association 600 may be encoded as: [[pcch-CoverageLevel-r17 ENUMERATED {PAGE-CL1, PAGE-CL2, . . . }]].

Figure 7:
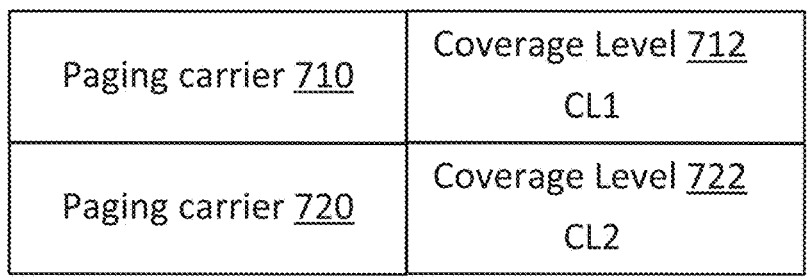
FIG. 7 illustrates an association of coverage levels to paging carriers according to some aspects of the present disclosure.

FIG. 7 illustrates an association 700 of coverage levels to paging carriers according to some aspects of the present disclosure. The association 700 illustrates an example of an indication of one or more paging coverage level(s) for each of a plurality of paging carriers of a cell (e.g., as discussed above with respect to FIGS. 3 and 4). In particular, the example of FIG. 7 illustrates a single coverage level indication for each paging carrier. In some instances, each paging carrier supports a single paging coverage level such that the indicated paging coverage level is the only coverage level supported by the paging carrier. For example, the association 700 shows a paging carrier 710 can be associated with a coverage level 712 that includes coverage level 1, as indicated by CL1. The association 700 also shows a paging carrier 720 can be associated with a coverage level 722 that includes coverage level 2, as indicated by CL2. Accordingly, if the paging carriers 710 and 720 support only a single paging carrier, the paging carrier 710 supports coverage level 1 (and does not support coverage levels 2 and 3), while paging carrier 720 supports coverage level 2 (and does not support coverage levels 1 and 3). In some aspects, the association 700 may encoded as: [[pcch-CoverageLevel-r17 ENUMERATED {CL1, CL2}]].

In some instances, each paging carrier supports the indicated paging coverage level and any higher (better) coverage levels. Using such an approach in the context of FIG. 7, the paging carrier 710 supports coverage level 1 (and does not support coverage levels 2 and 3) based on the CL1 indication, while paging carrier 720 supports coverage levels 1 and 2 (and does not support coverage levels 3) based on the CL2 indication.

Figure 8:
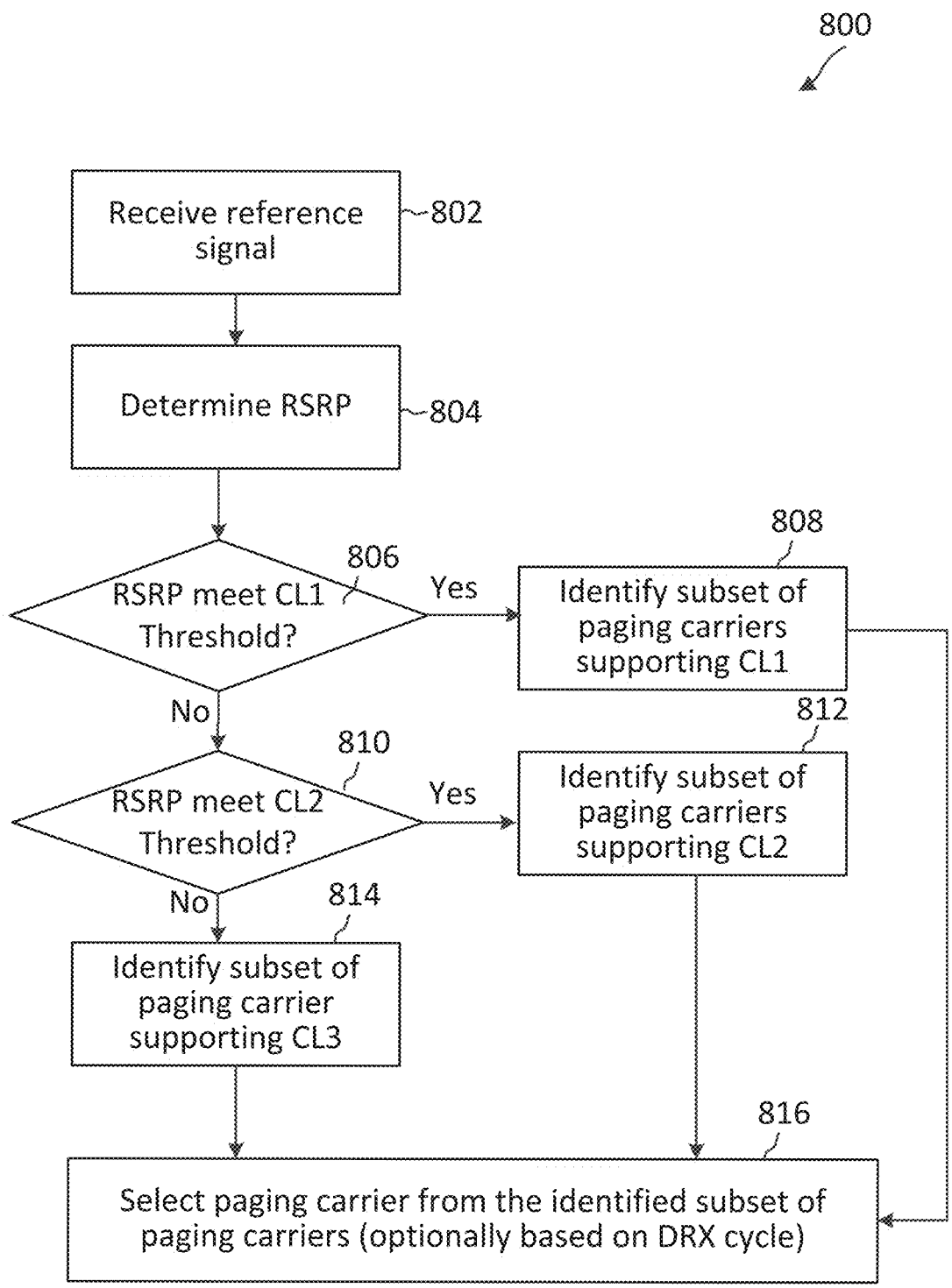
FIG. 8 is a flow diagram illustrating coverage-level-based paging communication method according to some aspects of the present disclosure.

FIG. 8 is a flow diagram illustrating coverage-level-based paging communication method 800 according to some aspects of the present disclosure. Aspects of the method 800 can be executed by a computing device (e.g., a processor, processing circuit, and/or other suitable component) of a wireless communication device (e.g., a UE 115) or other suitable means for performing the steps. As illustrated, the method 800 includes a number of enumerated aspects, but the method 800 may include additional steps before, after, and in between the enumerated aspects. In some instances, one or more of the enumerated aspects may be omitted or performed in a different order.

At block 802, the UE receives a reference signal from a BS (e.g., a BS 105). The reference signal may be one or more of a PBCH signal, a SIB signal, a DMRS, or any predetermined waveform sequence. In some aspects, the UE may receive the reference signal over an anchor carrier. In some aspects, the UE may receive the reference signal over a non-anchor carrier.

At block 804, the UE determines a reference signal receive power (RSRP) based on the reference measurement signal received at block 802. In some instances, the RSRP can be determined by measuring a signal energy based on predetermined time and/or frequency locations where the reference signal is transmitted by the BS.

At block 806, the UE determines whether the RSRP meets a coverage level 1 (CL1) threshold. If the RSRP meets the coverage level 1 (CL1) threshold, then the method 800 proceeds to block 808 where the UE identifies a subset of paging carriers from a plurality of paging carrier for a cell that support coverage level 1. If, at block 806, the RSRP does not meet the coverage level 1 (CL1) threshold, then the method 800 proceeds to block 810.

At block 810, the UE determines whether the RSRP meets a coverage level 2 (CL2) threshold. If the RSRP meets the coverage level 2 (CL2) threshold, then the method 800 proceeds to step 812 where the UE identifies a subset of paging carriers from the plurality of paging carrier for the cell that support coverage level 2. If, at block 810, the RSRP does not meet the coverage level 2 (CL2) threshold, then the method 800 proceeds to step 814. At block 814, the UE identifies a subset of paging carriers from the plurality of paging carrier for the cell that support coverage level 3.

At block 816, the UE selects a paging carrier from the subset of paging carriers identified at block 808, 812, or 814. In some instances, the UE follows a legacy paging carrier selection scheme to select among the subset of paging carriers supporting its coverage level. For instance, in the legacy paging carrier selection scheme, the BS may configure the UE with a weighting factor (e.g., related to paging load distribution among the paging carriers) for selecting a paging carrier from among paging carriers. The BS and/or the UE may select a paging carrier based at least in part on the UE identifier (ID) and the paging weight factor.

In some aspects, the UE selects, at block 816, the paging carrier from the subset of paging carriers based on a discontinuous reception (DRX) cycle of the UE. In some instances, the UE can identify the paging carriers that support both the UE's coverage level as well as the UE's DRX cycle. The UE can then select a paging carrier that supports the coverage level and DRX cycle. In selecting a paging carrier that supports the coverage level, in some instances, the UE may select the paging carrier with a coverage level that matches the coverage level of the UE. And in some cases, the UE may then use the selected paging carrier for receiving a paging message from the base station.

While the method 800 is described in the context of three coverage levels, the concepts are equally applicable to other numbers of coverage levels, including without limitation 2, 4, 5, 6, 7, 8, 9, 10, etc.

Figure 9:
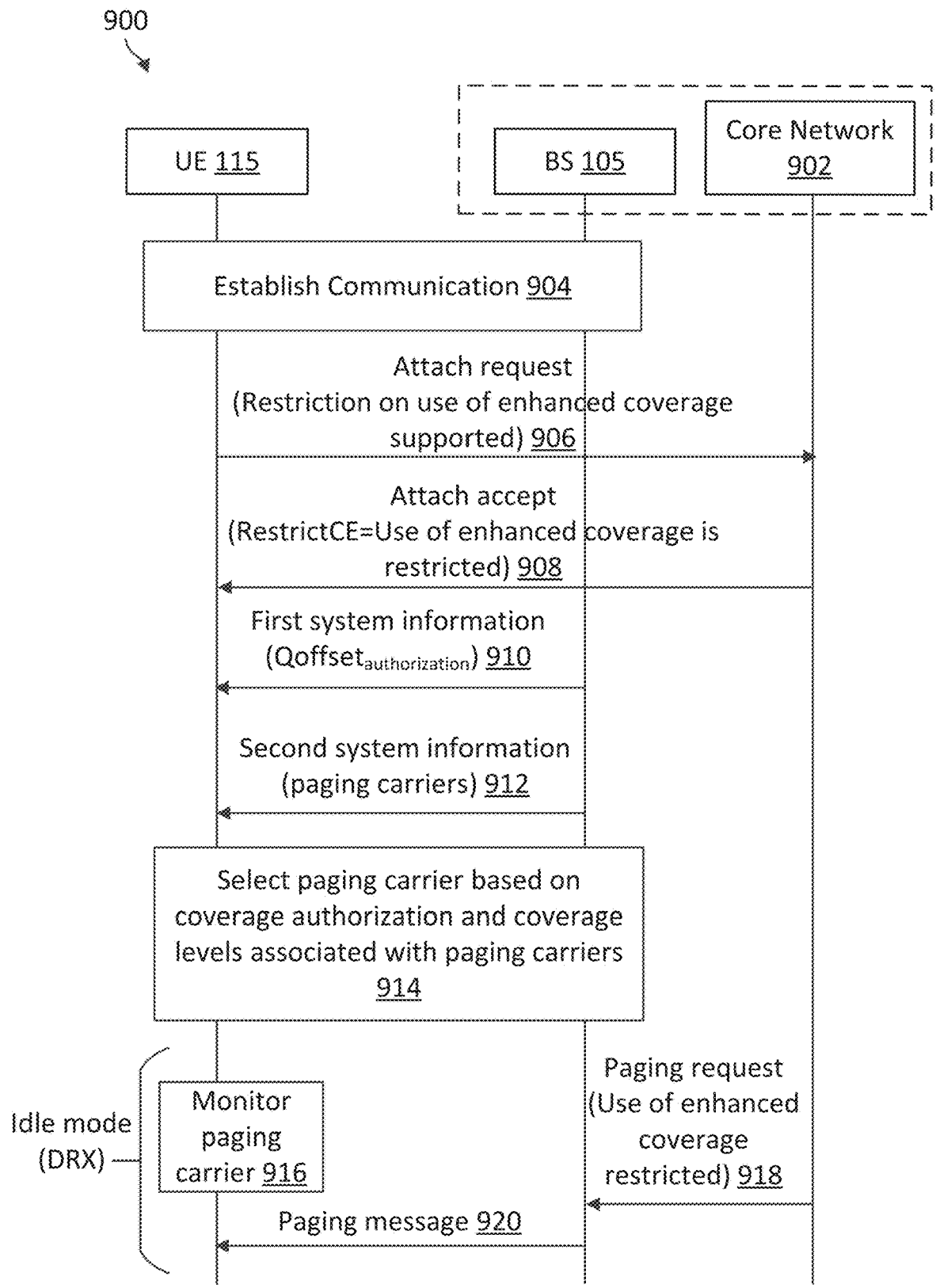
FIG. 9 is a signaling diagram illustrating coverage-level-based paging communication according to some aspects of the present disclosure.

FIG. 9 is a signaling diagram illustrating coverage-level-based paging communication 900 according to some aspects of the present disclosure. As shown, aspects of the coverage-level-based paging communication 900 can be performed by a UE 115, a BS 105, and/or a core network 902. The core network 902 may include components such as MME and AMF as discussed above in relation to FIG. 1. In some aspects, the coverage-level-based paging communication 900 provides coverage restrictions on a UE that can, in turn, limit the paging carriers the UE is able to utilize.

At 904, the UE 115 establishes communication with the BS 105. In some instances, the UE establishes communication with the BS 105 by initiating a random access procedure with the BS and establishing an RRC connection with the BS. In some instances, at 904, the UE performs a tracking area update (TAU update). For example, the UE may be operating in an idle mode and move to a new tracking area due to mobility. As a result, in conjunction with the TAU update the UE can select a paging carrier based on its coverage level in accordance with aspects of FIG. 9.

At 906, the UE 115 can transmit an attachment request and/or a TAU request to the BS 105 and/or core network 902. In some instances, the attachment request and/or TAU request may indicate that the UE supports restrictions on the use of enhanced coverage.

At 908, the UE 115 can receive from the BS 105 and/or core network 902 an attachment acceptance and/or a TAU acceptance. In some instances, the attachment and/or TAU acceptance may indicate to the UE 115 that restrictions on the use of enhanced coverage is enabled. For example, the UE 115 may receive an indication that "Restrict CE" is enabled or activated.

At 910, the UE 115 receives first system information from the BS 105. The first system information can be received by the UE as a SIB (e.g., SIB1-NB) and include an indication of the coverage level restriction (e.g., $Qoffset_{authorization}$) for the UE 115. In some instances, the coverage level restriction may indicate what coverage level(s) the UE 115 is able to utilize. In some aspects, for eMTC devices or other devices, when the use of enhanced coverage is restricted, the UE can restrict enhanced coverage operation to CE Mode A and no additional threshold may be configured via SIB.

At 912, the UE 115 receives second system information from the BS 105. The second system information can be received by the UE 115 as a SIB (e.g., SIB2-NB, SIB22-NB, SIB24-NB, etc.) and include an indication of a plurality of paging carriers. The indication of the plurality of paging carriers can provide a list of the supported coverage level(s) and/or supported DRX cycle length(s) for each paging carrier.

At 914, the UE 115 and/or the BS 105 can select a paging carrier based on the coverage authorization for the UE 115 and the coverage levels associated with each of the paging carriers of the cell. For example, the UE 115 can determine RxLev corresponding to its authorized coverage level (e.g., as indicated at 910) as: $RxLev_{authorized} = RxLev_{measured} - Qoffset_{authorization}$. The UE 115 can then determine or select the coverage level(s) supported by the determined RxLev. In some instances, the UE 115 may determine or select the supported coverage level(s) by referencing the list RSRP-ThresholdsNPRACH-InfoList[i]<=$RxLev_{authorizied}$, where i is an integer >=0. The UE 115 can then identify the subset paging carriers supporting its coverage level(s). If no paging carriers support its coverage level(s), then the UE 115 can utilize a legacy paging carrier selection procedure. In some instances, the UE 115 further limits the subset of paging carriers to those that support a DRX cycle of the UE (e.g., paging carriers supporting the same or a larger DRX cycle than the UE's DRX cycle). The UE 115 then selects a paging carrier from the subset of paging carriers supporting its coverage level and/or DRX cycle. In some instances, the UE follows a legacy paging carrier selection scheme to select among the subset of paging carriers supporting its coverage level and/or DRX cycle. For instance, in the legacy paging carrier selection scheme, the BS may configure the UE with a weighting factor (e.g., related to paging load distribution among the paging carriers) for selecting a paging carrier from among paging carriers. The BS and/or the UE may select a paging carrier based at least in part on the UE identifier (ID) and the paging weight factor.

At 916, the UE 115 monitors the paging carrier selected at 914. In some instances, the UE 115 monitors the paging carrier while operating in an idle mode. Further, in some instances, the UE monitors the paging based on a DRX cycle. For example, the BS 105 may configure the UE 115 with a UE-specific DRX cycle that is to be utilized for monitoring the paging carrier. In some instances, to monitor the selected paging carrier, the UE may tune the receiver chain of its transceiver unit (e.g., transceiver 1310 in FIG. 13) to the selected paging carrier (e.g., to monitor for a paging message from the base station).

At 918, the core network 902 may send a paging request message to the BS 105, for example, based on arrival of data for the UE 115 at the core network 902. The paging request message from the core network 902 may include an indication that the use of enhanced coverage is restricted for the UE 115. Similarly, the core network 902 may include an indication that the use of enhanced coverage is restricted and/or coverage level paging supported in a UE-RadioPagingInfo-NB information element (for NB-IoT devices) and/or UE-RadioPagingInfo information element (e.g., for eMTC devices). In some instances, BS 105 may receive the UE-RadioPagingInfo(-NB) information element with the paging request message from the core network 902.

At 920, the BS 105 transmits a paging message to the UE 115 over the paging carrier selected at 914. In some aspects, the BS 105 may select the paging carrier for paging the UE 115 upon receiving the paging request from the core network 902 and may utilize the indication (use of enhanced coverage restricted) indicated by the paging request for paging carrier selection. The UE 115, as a result of monitoring the selected paging carrier, can receive the paging message from the BS 105. The UE 115 can respond to the paging message in accordance with normal paging procedures. That is, in some instances, the UE may select the paging carrier with a coverage level that matches the coverage level of the UE, and use the selected paging carrier for receiving a paging message from the base station.

Figure 10:
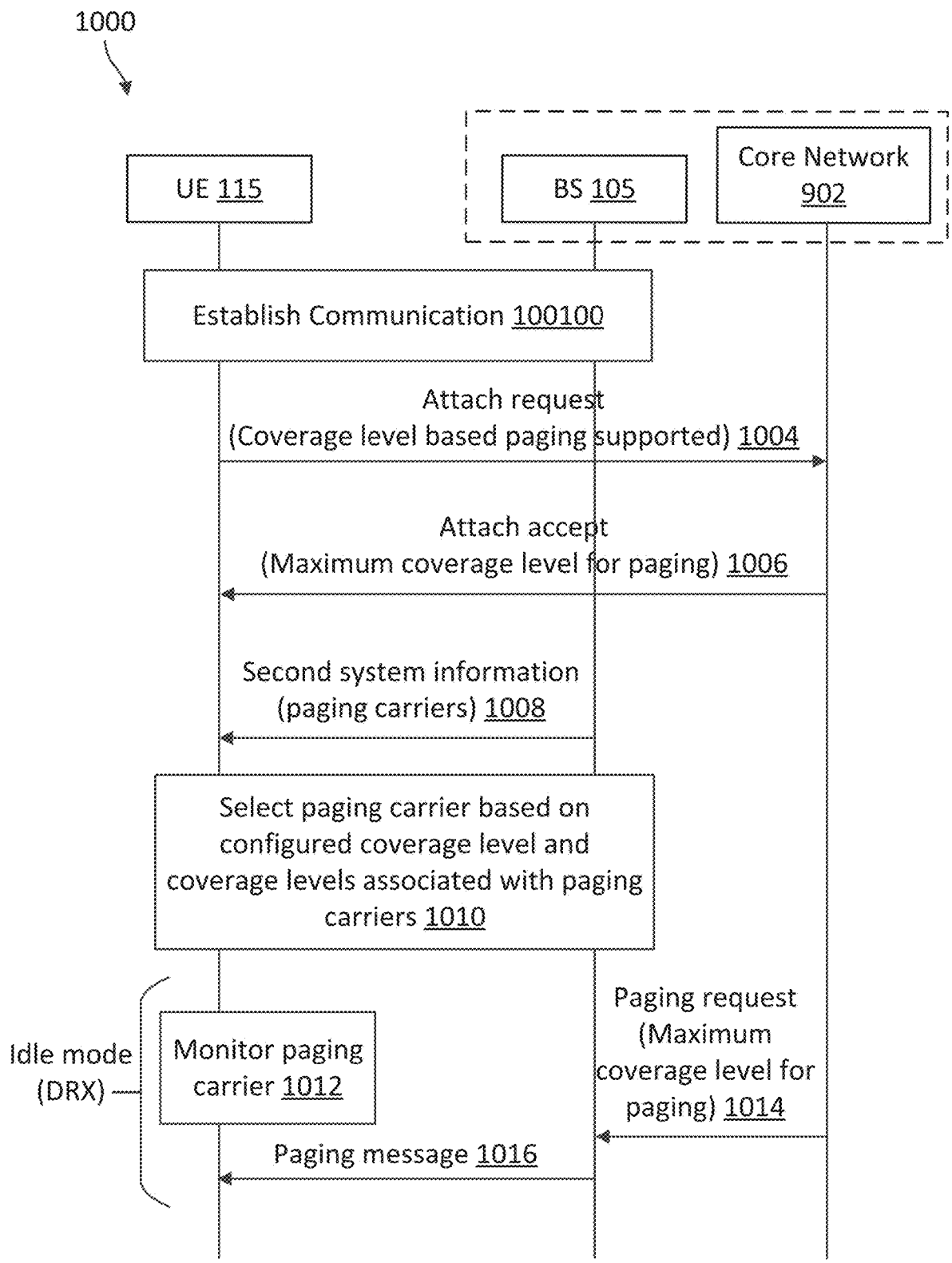
FIG. 10 is a signaling diagram illustrating coverage-level-based paging communication according to some aspects of the present disclosure.

FIG. 10 is a signaling diagram illustrating coverage-level-based paging communication 1000 according to some aspects of the present disclosure. As shown, aspects of the coverage-level-based paging communication 1000 can be performed by a UE 115, a BS 105, and/or a core network 902.

At 1002, the UE 115 establishes communication with the BS 105. In some instances, the UE establishes communication with the BS 105 by initiating a random access procedure with the BS and establishing an RRC connection with the BS. In some instances, at 1002, the UE performs a tracking area update (TAU update). For example, the UE may be operating in an idle mode and move to a new tracking area due to mobility. As a result, in conjunction with the TAU update the UE can select a paging carrier based on its coverage level in accordance with aspects of FIG. 10.

At 1004, the UE 115 can transmit an attachment request and/or a TAU request to the BS 105 and/or core network 902. In some instances, the attachment request and/or TAU request may indicate that the UE supports coverage-level-based paging carrier selection.

At 1006, the UE 115 can receive from the BS 105 and/or core network 902 an attachment acceptance and/or a TAU acceptance. In some instances, the attachment and/or TAU acceptance may indicate to the UE 115 that coverage-level-based paging carrier selection is enabled. For example, the UE 115 may receive an indication of the coverage level(s) the UE 115 is able to use for paging. In some instances, the UE 115 receives an indication of a maximum coverage level the UE is able to use for paging. In some instances, the UE 115 receives an indication of each coverage level the UE 115 is able to use for paging. Accordingly, the UE 115 may receive an indication as to whether or not the UE 115 is authorized to use each of the available coverage levels for paging.

At 1008, the UE 115 receives second system information from the BS 105. The second system information can be received by the UE 115 as a SIB (e.g., SIB2-NB, SIB22-NB, SIB24-NB, etc.) and include an indication of a plurality of paging carriers. The indication of the plurality of paging carriers can provide a list of the supported coverage level(s) and/or supported DRX cycle length(s) for each paging carrier.

At 1010, the UE 115 and/or the BS 105 can select a paging carrier based on the configured coverage level of the UE 115 and the coverage levels associated with each of the paging carriers of the cell. The UE 115 can then identify the subset paging carriers supporting its coverage level(s). In some instances, the UE 115 may identify paging carriers supporting the indicated maximum coverage level (e.g., from 1006) and any worse coverage levels. For example, if the UE 115 receives an indication that its maximum coverage level is coverage level 2, then the UE 115 may select paging carriers supporting coverage levels 2 and 3. In such cases, a paging carrier that only supports coverage level 1 may not have sufficient repetitions to reach a UE in coverage level 2, but a paging carrier that supports up to coverage level 3 can be used to reach UEs in any coverage level up to coverage level 3, including UEs in coverage levels 1 and 2. In some instances, the UE may only select paging carriers supporting the indicated coverage level (e.g., from 1006) for paging. For example, if the UE 115 receives an indication that its coverage level is coverage level 2, then the UE 115 may select only paging carriers supporting coverage level 2. If no paging carriers support its coverage level(s), then the UE 115 can utilize a legacy paging carrier selection procedure. In some instances, the UE 115 further limits the subset of paging carriers to those that support a DRX cycle of the UE (e.g., paging carriers supporting the same or a larger DRX cycle than the UE's DRX cycle). The UE 115 then selects a paging carrier from the subset of paging carriers supporting its configured coverage level and/or DRX cycle. In some instances, the UE follows a legacy paging carrier selection scheme to select among the subset of paging carriers supporting its configured coverage level and/or DRX cycle. For instance, in the legacy paging carrier selection scheme, the BS may configure the UE with a weighting factor (e.g., related to paging load distribution among the paging carriers) for selecting a paging carrier from among paging carriers. The BS and/or the UE may select a paging carrier based at least in part on the UE identifier (ID) and the paging weight factor.

At 1012, the UE 115 monitors the paging carrier selected at 1010. In some instances, the UE 115 monitors the paging carrier while operating in an idle mode. Further, in some instances, the UE monitors the paging based on a DRX cycle. For example, the BS 105 may configure the UE 115 with a UE-specific DRX cycle that is to be utilized for monitoring the paging carrier. In some instances, the UE monitors the paging carrier by tuning the receiver chain of its transceiver unit (e.g., transceiver 1310 in FIG. 13) to the selected paging carrier.

At 1014, the core network 902 may send a paging request message to the BS 105. The paging request message from the core network 902 may include in the paging request message an indication that the UE 115 supports coverage-level-based paging carrier selection and/or indicate the maximum coverage level for paging for the UE 115 (similar to the indication to the UE 115 at 1006). In some aspects, the BS 105 may select the paging carrier for paging the UE 115 upon receiving the paging request from the core network 902 and may utilize the indication (maximum coverage level for paging) indicated by the paging request for paging carrier selection.

At 1016, the BS 105 transmits a paging message to the UE 115 over the paging carrier selected at 1010. The UE 115, as a result of monitoring the selected paging carrier, can receive the paging message from the BS 105. The UE 115 can respond to the paging message in accordance with normal paging procedures.

In some aspects, the BS 105 may apply repetitions to the paging message transmissions (at 920 of FIG. 9 and/or at 1016 of FIG. 10) based on a coverage level of the paging carrier used for paging the UE 115. For instance, the BS 105 may use a lower number of repetitions when the paging carrier is for a coverage level of 1 (good coverage) than when the paging carrier is for a coverage level of 3 (bad coverage or deep coverage). In an example, the BS 105 may apply 1 repetition for coverage level 1, 2 repetitions for coverage level 2, and 64 repetitions for coverage level 3. In some instances, any suitable number of repetitions between 1 and 2048 (or higher), including 1, 2, 4, 8, 16, 32, 64, 128, 256, 512, 1024, 2048 or otherwise, may be utilized for each coverage level. Accordingly, associating different paging carriers with different coverage levels allows the BS 105 to apply a number of repetitions that is catered for a specific coverage level instead of always applying a high number of repetitions to provide deep coverage. Additionally, utilizing a lower number of repetitions for a UE in good coverage may allow the BS to utilize a shorter DRX cycle. As such, coverage-level-based paging communications can improve paging efficiency, resource utilization efficiency, and paging latency.

Figure 11:
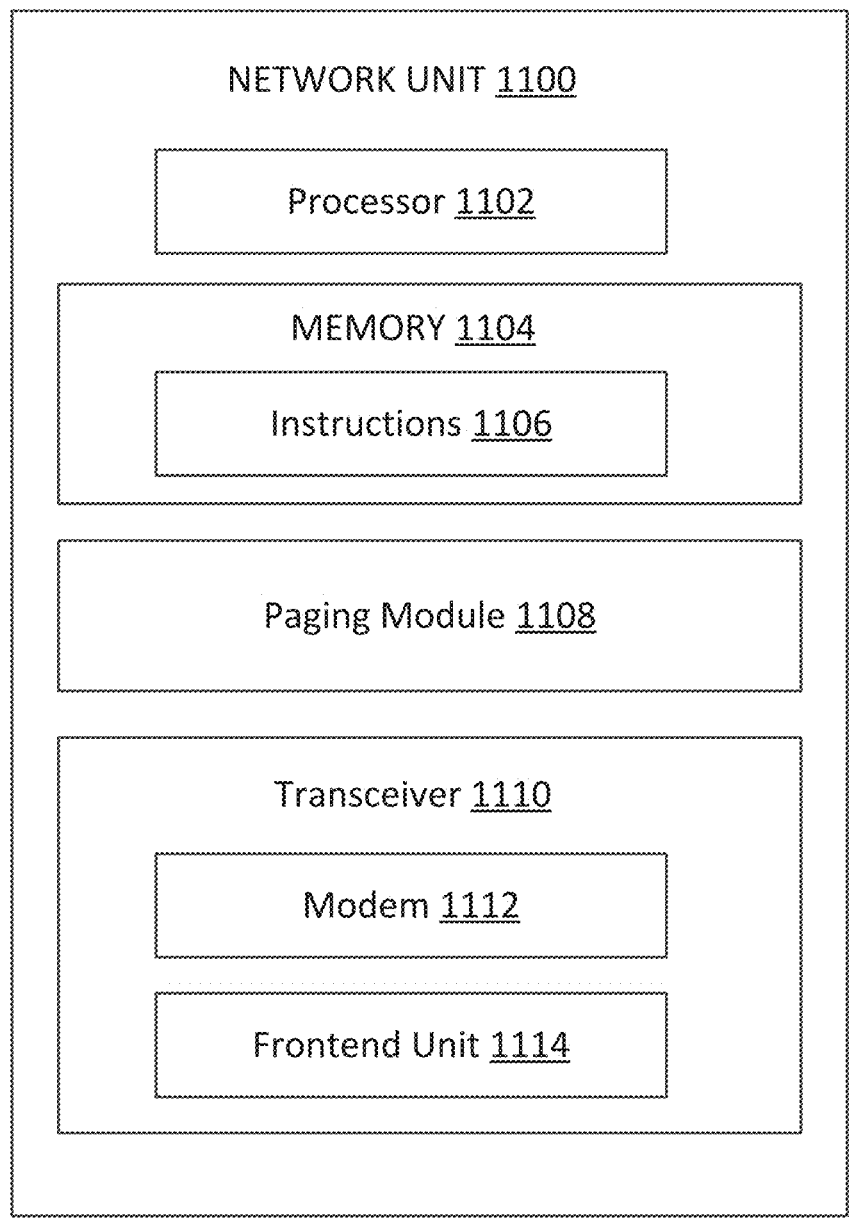
FIG. 11 is a block diagram of a network unit according to some aspects of the present disclosure.

FIG. 11 is a block diagram of a network unit 1100 according to some aspects of the present disclosure. The network unit 1100 may be a network component of a core network such as the core network 902 discussed above in FIGS. 9 and 10. As shown, the network unit 1100 may include a processor 1102, a memory 1104, a paging module 1108, and a transceiver 1110 including a modem subsystem 1112 and a frontend unit 1114. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 1104 may include a non-transitory computer-readable medium. The memory 1104 may store instructions 1106. The instructions 1106 may include instructions that, when executed by the processor 1102, cause the processor 1102 to perform operations described herein with reference to a core network (e.g., core network 902) in connection with aspects of the present disclosure, including aspects of FIGS. 2-10. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The paging module 1108 may be implemented via hardware, software, or combinations thereof. For example, the paging module 1108 may be implemented as a processor, circuit, and/or instructions 1106 stored in the memory 1104 and executed by the processor 1102. The paging module 1108 may be used for various aspects of the present disclosure, for example, aspects of FIGS. 2-10. For example, the paging module 1108 can be configured to perform network attachment procedures and/or TAU procedures with one or more UEs, determine coverage level restrictions for one or more UEs, determine configured coverage levels for one or more UEs, send paging requests to a BS, and/or other functions of a core network associated with the coverage-level-based paging carrier selection techniques of the present disclosure.

As shown, the transceiver 1110 may include the modem subsystem 1112 and the frontend unit 1114. The transceiver 1110 can be configured to communicate bi-directionally with other devices, such as the BSs 105 and/or another core network element. The modem subsystem 1112 may be configured to modulate and/or encode data according to a MCS, e.g., a LDPC coding scheme, a turbo coding scheme, a convolutional coding scheme, etc. The frontend unit 1114 may include electrical-to-optical (E/O) components and/or optical-to-electrical (O/E) components that convert an electrical signal to an optical signal for transmission to a BS and/or receive an optical signal from the BS and convert the optical signal into an electrical signal, respectively. The frontend unit 1114 may be configured to process (e.g., perform analog to digital conversion or digital to analog conversion, optical to electrical conversion or electrical to optical conversion, etc.) modulated/encoded data from the modem subsystem 1112 (on outbound transmissions) or of transmissions originating from another source such as a backend or core network. Although shown as integrated together in transceiver 1110, the modem subsystem 1112 and the frontend unit 1114 may be separate devices that are coupled together at the network unit 1100 to enable the network unit 1100 to communicate with other devices. The frontend unit 1114 may transmit optical signals carrying the modulated and/or processed data over an optical link to other devices. The frontend unit 1114 may further receive optical signals carrying data messages and provide the received data messages for processing and/or demodulation at the transceiver 1110.

Figure 12:
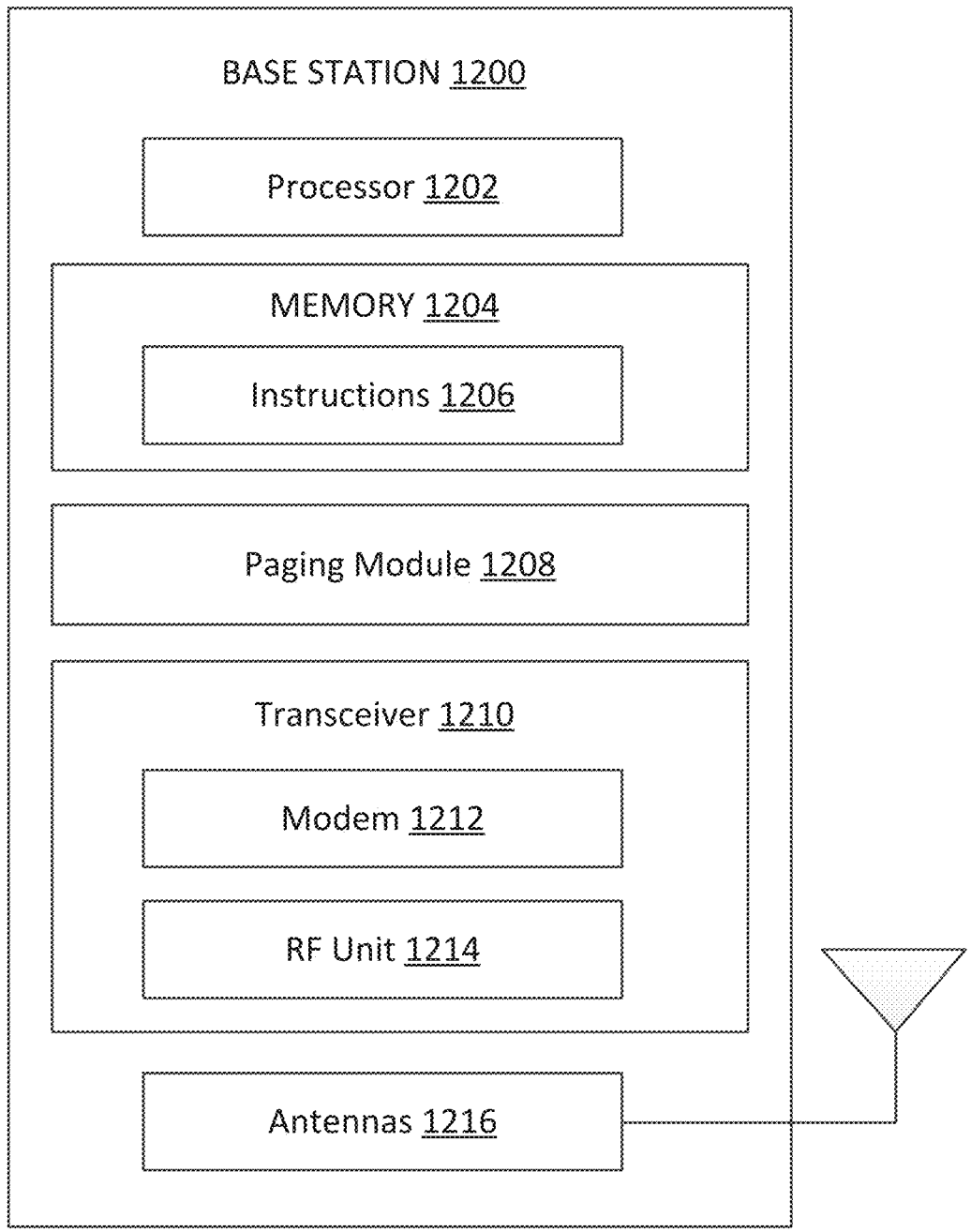
FIG. 12 is a block diagram of a base station (BS) according to some aspects of the present disclosure.

FIG. 12 is a block diagram of a base station (BS) 1200 according to some aspects of the present disclosure. The BS 1200 may be a BS 105 as discussed above in FIGS. 1, 2, 9, and 10. As shown, the BS 1200 may include a processor 1202, a memory 1204, a paging module 1208, a transceiver 1210 including a modem subsystem 1212 and a RF unit 1214, and one or more antennas 1216. These elements may be in direct or indirect communication with each other, for example via one or more buses.

The processor 1202 may have various features as a specific-type processor. For example, these may include a CPU, a DSP, an ASIC, a controller, a FPGA device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 1204 may include a non-transitory computer-readable medium. The memory 1204 may store instructions 1206. The instructions 1206 may include instructions that, when executed by the processor 1202, cause the processor 1202 to perform operations described herein, for example, aspects of FIGS. 2-10 and 15. Instructions 1206 may also be referred to as code, which may be interpreted broadly to include any type of computer-readable statement(s) as discussed above with respect to FIG. 11.

The paging module 1208 may be implemented via hardware, software, or combinations thereof. For example, the paging module 1208 may be implemented as a processor, circuit, and/or instructions 1206 stored in the memory 1204 and executed by the processor 1202. In some examples, the paging module 1208 can be integrated within the modem subsystem 1212. For example, the paging module 1208 can be implemented by a combination of software components (e.g., executed by a DSP or a general processor) and hardware components (e.g., logic gates and circuitry) within the modem subsystem 1212.

The paging module 1208 may be used for various aspects of the present disclosure, for example, aspects of FIGS. 2-10 and 15. The paging module 1208 can be configured to cause the transceiver 1210 to transmit, to a UE (e.g., a narrowband internet of things (NB-IoT) device, an enhanced machine-type communication (eMTC) device, or other wireless communication device), an indication of a plurality of paging carriers. In some instances, the indication transmitted to the UE indicates a paging coverage level for each of the plurality of paging carriers of a cell (e.g., as discussed with respect to FIGS. 3 and 5-7). The paging module 1208 can be configured to select, based on a coverage level of the UE, a paging carrier from the plurality of paging carriers. In some instances, the paging module 1208 can be configured to select the paging carrier for a UE from the plurality of paging carriers by identifying a subset of the plurality of paging carriers supporting the coverage level of the UE and selecting a particular paging carrier from the subset supporting the coverage level of the UE. In some instances, the paging module 1208 can be configured to select or determine the paging carrier based on a discontinuous reception (DRX) cycle of the UE. In some instances, the paging module 1208 can be configured to cause the transceiver 1210 to transmit, to the UE using the paging carrier selected from the plurality of paging carriers, a paging message. In some instances, the paging module 1208 can be configured to cause the transceiver 1210 to transmit, to the UE, an indication of a coverage restriction of the UE. In some instances the paging module 1208 can be configured to receive, from a core network (e.g., core network 902), a notice of the coverage restriction of the UE. In some aspects, the paging module 1208 can be configured to receive an indication the UE supports coverage-level-based paging carrier selection and cause the transceiver 1210 to transmit, to the UE, an indication of the coverage level of the user equipment. The paging module 1208 can be configured to receive the indication the UE supports coverage-level-based paging carrier selection from the UE (e.g., via an attachment request and/or TAU request) and/or a core network (e.g., via a paging request message). In some aspects, the paging module 1208 can be configured to transmit, to the UE, a first indication of one or more paging carriers, the first indication indicating for a paging carrier of the one or more paging carriers, a coverage level supported by the paging carrier; and transmit, to the UE, a paging message via the paging carrier based on a match between the coverage level supported by the paging carrier and a coverage level of the user equipment.

As shown, the transceiver 1210 may include the modem subsystem 1212 and the RF unit 1214. The transceiver 1210 can be configured to communicate bi-directionally with other devices, such as the UEs 115 and/or a core network 902. In some instances, the transceiver 1210 may include multiple components, some of which are configured to communicate with UEs 115 and some of which are configured to communicate with the core network 902. In some instances, the BS may include additional frontend components (e.g., RF, optical, and/or optical-electric components) for communicating with the core network 902. The modem subsystem 1212 may be configured to modulate and/or encode data according to a MCS, e.g., a LDPC coding scheme, a turbo coding scheme, a convolutional coding scheme, a digital beamforming scheme, etc. The RF unit 1214 may be configured to process (e.g., perform analog to digital conversion or digital to analog conversion, etc.) on modulated/encoded data (e.g., RRC messages, SIB messages, DRX configurations, DCI messages, paging messages, paging configuration messages, attachment accept, TAU accept, etc.) from the modem subsystem 1212 (on outbound transmissions) or of transmissions originating from another source, such as a UE 115 or core network 902. The RF unit 1214 may be further configured to perform analog beamforming in conjunction with the digital beamforming. Although shown as integrated together in transceiver 1210, the modem subsystem 1212 and/or the RF unit 1214 may be separate devices that are coupled together at the BS 105 to enable the BS 105 to communicate with other devices.

The RF unit 1214 may provide the modulated and/or processed data, e.g. data packets (or, more generally, data messages that may contain one or more data packets and other information), to the antennas 1216 for transmission to one or more other devices. This may include, for example, transmission of information to complete attachment to a network and communication with a UE 115 according to aspects of the present disclosure. The antennas 1216 may further receive data messages transmitted from other devices and provide the received data messages for processing and/or demodulation at the transceiver 1210. The transceiver 1210 may provide the demodulated and decoded data (e.g., attachment request, TAU request, etc.) to the paging module 1208 for processing. The antennas 1216 may include multiple antennas of similar or different designs in order to sustain multiple transmission links.

In an embodiment, the BS 1200 can include multiple transceivers 1210 implementing different RATs (e.g., NR and LTE). In an embodiment, the BS 1200 can include a single transceiver 1210 implementing multiple RATs (e.g., NR and LTE). In an embodiment, the transceiver 1210 can include various components, where different combinations of components can implement different RATs.

Figure 13:
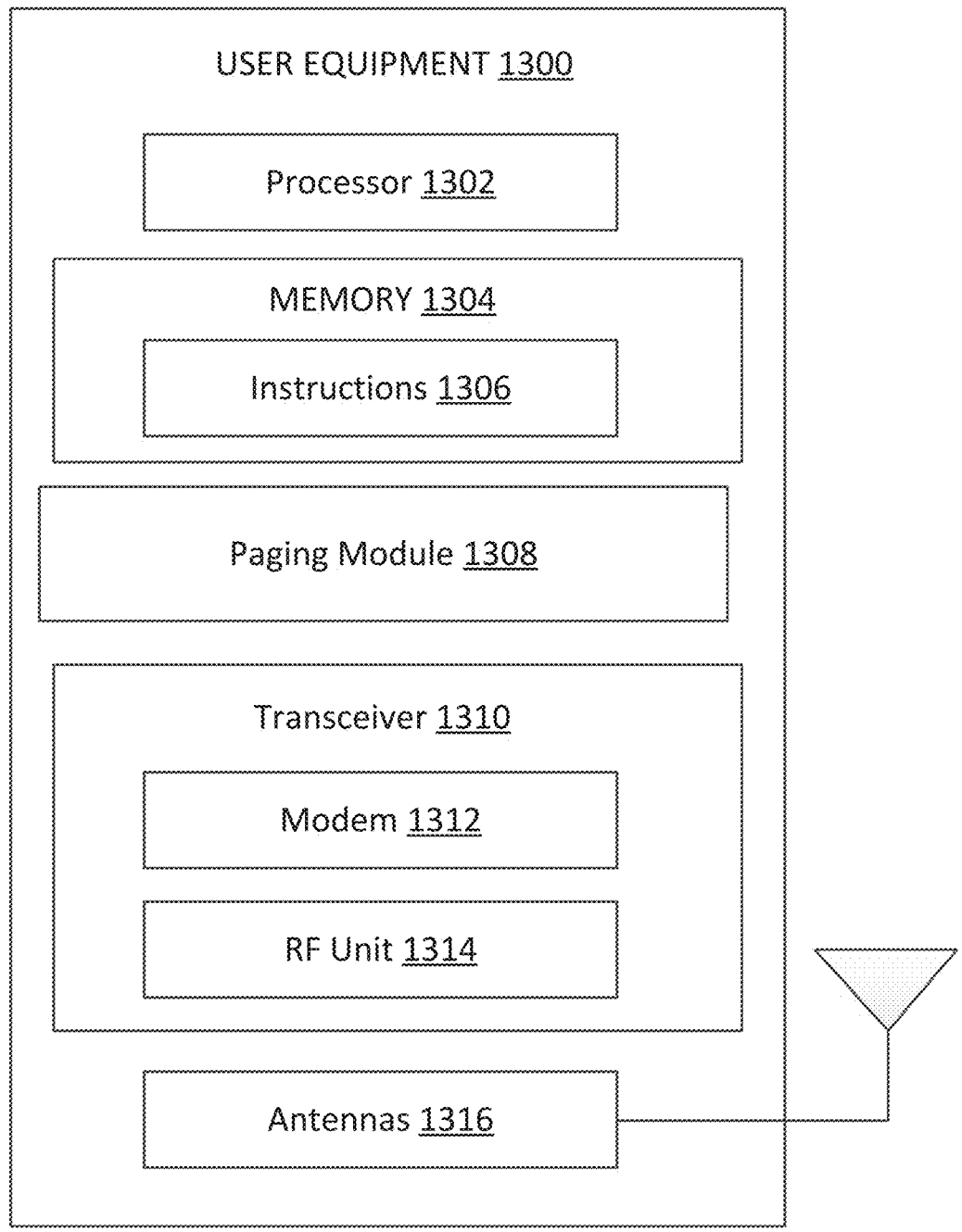
FIG. 13 is a block diagram of a user equipment (UE) according to some aspects of the present disclosure.

FIG. 13 is a block diagram of a user equipment (UE) 1300 according to some aspects of the present disclosure. The UE 1300 may be a UE 115 discussed above in FIGS. 1, 2, 9, and 10. As shown, the UE 1300 may include a processor 1302, a memory 1304, a paging module 1308, a transceiver 1310 including a modem subsystem 1312 and a radio frequency (RF) unit 1314, and one or more antennas 1316. These elements may be in direct or indirect communication with each other, for example via one or more buses.

The processor 1302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1304 includes a non-transitory computer-readable medium. The memory 1304 may store, or have recorded thereon, instructions 1306. The instructions 1306 may include instructions that, when executed by the processor 1302, cause the processor 1302 to perform the operations described herein with reference to the UEs 115 in connection with embodiments of the present disclosure, for example, aspects of FIGS. 2-10 and 14. Instructions 1306 may also be referred to as program code. The program code may be for causing a wireless communication device to perform these operations, for example by causing one or more processors (such as processor 1302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The paging module 1308 may be implemented via hardware, software, or combinations thereof. For example, the paging module 1308 may be implemented as a processor, circuit, and/or instructions 1306 stored in the memory 1304 and executed by the processor 1302. In some examples, the paging module 1308 can be integrated within the modem subsystem 1312. For example, the paging module 1308 can be implemented by a combination of software components (e.g., executed by a DSP or a general processor) and hardware components (e.g., logic gates and circuitry) within the modem subsystem 1312.

The paging module 1308 may be used for various aspects of the present disclosure, for example, aspects of FIGS. 2-10 and 14. The paging module 1308 can be configured to receive, from a BS 105, an indication of a plurality of paging carriers (e.g., as discussed with respect to FIGS. 3 and 5-7). The paging module 1308 can also be configured to select, based on a coverage level of the user equipment, a paging carrier from the plurality of paging carriers. In some instances, the paging module 1308 is configured to select the paging carrier from the plurality of paging carriers by identifying a subset of the plurality of paging carriers supporting the coverage level of the UE and selecting a particular paging carrier from the subset supporting the coverage level of the UE. In some instances, the paging module 1308 is configured to select the paging carrier based on a discontinuous reception (DRX) cycle of the UE. In some instances, the paging module 1308 can be configured to monitor a selected paging carrier for a paging message from the base station.

In some instances, the paging module 1308 can be configured to determine a coverage level of the UE 1300. In some aspects, the paging module 1308 can be configured to determine the coverage level based on a narrow-band physical random access channel (NPRACH) threshold and a reference signal receive power (RSRP) (e.g., for a NB-IoT device). In some aspects, the paging module 1308 can be configured to determine the coverage level based on a physical random access channel (PRACH) threshold and a reference signal receive power (RSRP) (e.g., for a eMTC device). In some aspects, the paging module 1308 can be configured to determine the coverage level based on a paging threshold and a reference signal receive power (RSRP). In some instances, the paging module 1308 can be configured to determine the coverage level based on a network coverage restriction of the UE 1300. In some instances, the paging module 1308 can be configured to cause the transceiver 1310 to transmit, to a network (e.g., core network 902), an indication the UE 1300 supports coverage-level-based paging carrier selection. In some aspects, the paging module 1308 can be configured to receive, from the BS 105 and/or core network 902, an indication of the coverage level of the UE 1300. In some aspects, the paging module 1308 can be configured to receive, from the BS 105, a first indication of one or more paging carriers, the first indication indicating for a paging carrier of the one or more paging carriers, a coverage level supported by the paging carrier; and receive, from the BS 105, a paging message via the paging carrier based on a match between the coverage level supported by the paging carrier and a coverage level of the user equipment.

As shown, the transceiver 1310 may include the modem subsystem 1312 and the RF unit 1314. The transceiver 1310 can be configured to communicate bi-directionally with other devices, such as the BSs 105. The modem subsystem 1312 may be configured to modulate and/or encode the data from the memory 1304 and/or the paging module 1308 according to a modulation and coding scheme (MCS), e.g., a low-density parity check (LDPC) coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., attachment request, TAU request, etc.) from the modem subsystem 1312 (on outbound transmissions) or of transmissions originating from another source such as a BS 105 or another UE 115. The RF unit 1314 may be further configured to perform analog beamforming in conjunction with the digital beamforming. Although shown as integrated together in transceiver 1310, the modem subsystem 1312 and the RF unit 1314 may be separate devices that are coupled together at the UE 115 to enable the UE 115 to communicate with other devices.

The RF unit 1314 may provide the modulated and/or processed data, e.g. data packets (or, more generally, data messages that may contain one or more data packets and other information), to the antennas 1316 for transmission to one or more other devices. The antennas 1316 may further receive data messages transmitted from other devices. The antennas 1316 may provide the received data messages for processing and/or demodulation at the transceiver 1310. The transceiver 1310 may provide the demodulated and decoded data (e.g., RRC messages, SIB messages, DRX configurations, DCI messages, paging messages, paging configuration messages, attachment accept, TAU accept, etc.) to the paging module 1308 for processing. The antennas 1316 may include multiple antennas of similar or different designs in order to sustain multiple transmission links. The RF unit 1314 may configure the antennas 1316.

In an embodiment, the UE 1300 can include multiple transceivers 1310 implementing different RATs (e.g., NR and LTE). In an embodiment, the UE 1300 can include a single transceiver 1310 implementing multiple RATs (e.g., NR and LTE). In an embodiment, the transceiver 1310 can include various components, where different combinations of components can implement different RATs.

Figure 14:
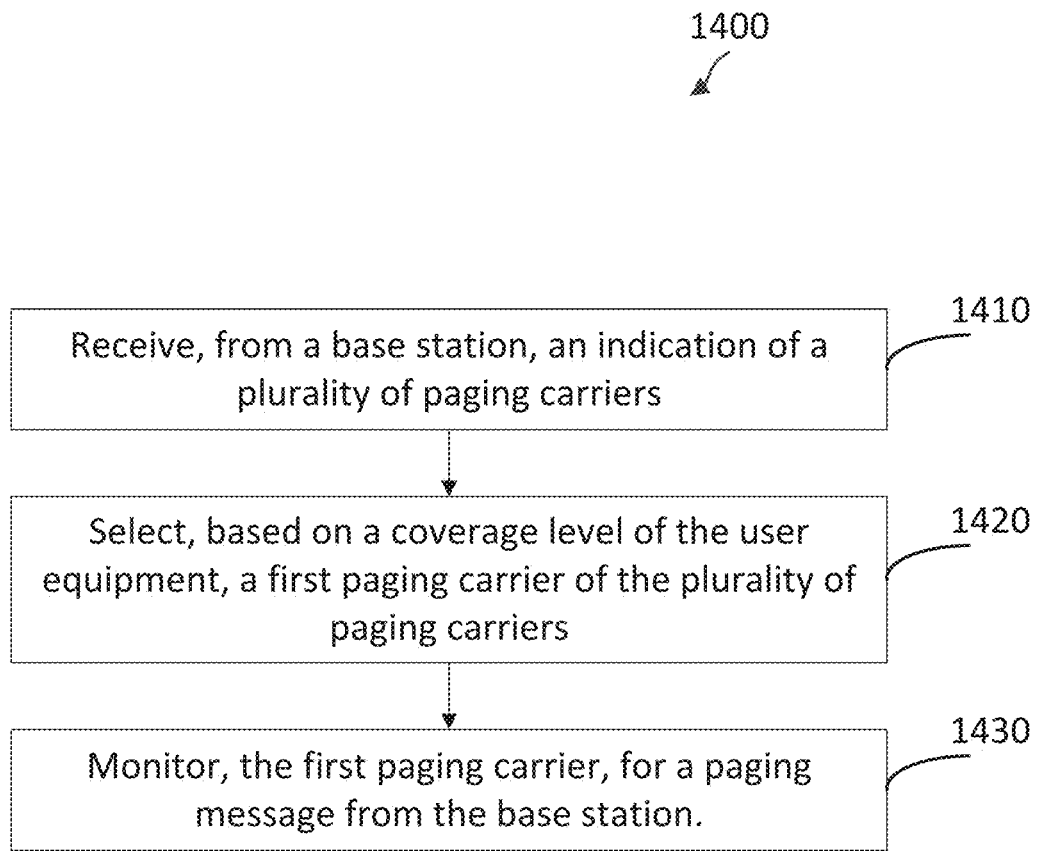
FIG. 14 is a flow diagram of a communication method according to some aspects of the present disclosure.

FIG. 14 is a flow diagram of a communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as a UE 115 or the UE 1300, may utilize one or more components, such as the processor 1302, the memory 1304, the paging module 1308, the transceiver 1310, the modem 1312, and the one or more antennas 1316, to execute the steps of method 1400. The method 1400 may employ similar mechanisms as described above in FIGS. 2-10. The method 1400 may be implemented between the UE 115, the BS 105, and/or core network 902 of FIGS. 1, 2, 9, and/or 10. As illustrated, the method 1400 includes a number of enumerated aspects, but the method 1400 may include additional aspects before, after, and in between the enumerated aspects. In some instances, one or more of the enumerated aspects may be omitted or performed in a different order.

At block 1410, the method 1400 includes the UE (e.g., a narrow-band internet of things (NB-IoT) device, an enhanced machine-type communication (eMTC) device, or other wireless communication device) receiving, from a BS, an indication of a plurality of paging carriers. In some instances, the indication received from the BS indicates a paging coverage level for each of the plurality of paging carriers of a cell (e.g., as discussed with respect to FIGS. 3 and 5-7). In some aspects, the paging coverage level for each of the plurality of paging carriers includes one or more paging coverage levels. In some instances, the indication may include a value to indicate the one or more paging coverage levels supported by a paging carrier (e.g., as shown in FIGS. 5-7). In some instances, the indication may include a bit for each paging coverage level to indicate whether each paging coverage level is supported or not supported by the paging carrier (e.g., as shown in FIG. 6). In some instances, each paging carrier supports a single paging coverage level. In some aspects, the UE receives the indication from the BS via a system information block (SIB) (e.g., SIB2-NB, SIB22-NB, SIB24-NB, or other suitable SIB), a downlink common configuration message, and/or a paging control channel (PCCH) configuration message.

At block 1420, the method 1400 includes the UE selecting, based on a coverage level of the user equipment, a paging carrier from the plurality of paging carriers. In some instances, the UE selects the paging carrier from the plurality of paging carriers by identifying a subset of the plurality of paging carriers supporting the coverage level of the UE and selecting a particular paging carrier from the subset supporting the coverage level of the UE. In some instances, the UE selects the paging carrier based on a discontinuous reception (DRX) cycle of the UE. The DRX cycle of the UE may be configured or assigned by the BS. In some aspects, the UE receives, from the BS, an indication of one or more DRX cycle length(s) supported by each of the plurality of paging carriers. The indication of the DRX cycle length(s) may be received by the UE as part of the indication of the plurality of paging carriers (received at block 1410) or received as a separate indication.

At block 1430, the method 1400 includes the UE monitoring, the paging carrier selected from the plurality of paging carriers (at block 1420), for a paging message from the base station. In some instances, the UE monitors the paging carrier by tuning the receiver chain of its transceiver unit (e.g., transceiver 1310 in FIG. 13) to the selected paging carrier (e.g., to monitor for a paging message from the base station). In some instances, the method 1400 includes the UE determining its coverage level. In some aspects, the UE determines the coverage level based on a narrow-band physical random access channel (NPRACH) threshold and a reference signal receive power (RSRP) (e.g., for a NB-IoT device). In some aspects, the UE determines the coverage level based on a physical random access channel (PRACH) threshold and a reference signal receive power (RSRP) (e.g., for a eMTC device). In some aspects, the UE determines the coverage level based on a paging threshold and a reference signal receive power (RSRP). In some instances, the UE determines the coverage level based on a coverage restriction of the UE.

In some instances, the method 1400 includes the UE transmitting, to a network (e.g., core network 902), an indication the UE supports coverage-level-based paging carrier selection. In some aspects, the UE receives, from the network, an indication of the coverage level of the user equipment.

Figure 15:
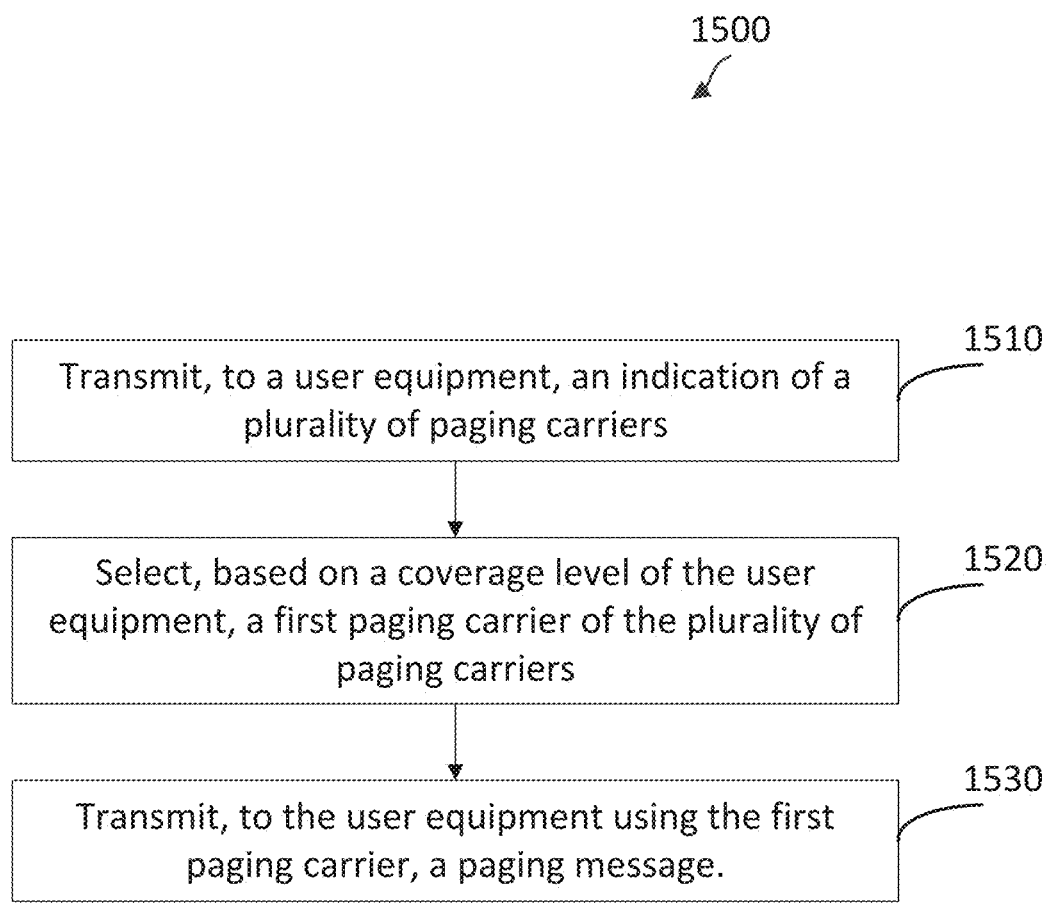
FIG. 15 is a flow diagram of a communication method according to some aspects of the present disclosure.

FIG. 15 is a flow diagram of a communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as a BS 105 or the BS 1200, may utilize one or more components, such as the processor 1202, the memory 1204, the paging module 1208, the transceiver 1210, the modem 1212, and the one or more antennas 1216, to execute the steps of method 1500. The method 1300 may employ similar mechanisms as described above in FIGS. 2-10. The method 1500 may be implemented between the UE 115, the BS 105, and/or core network 902 of FIGS. 1, 2, 9, and/or 10. As illustrated, the method 1500 includes a number of enumerated aspects, but the method 1500 may include additional aspects before, after, and in between the enumerated aspects. In some instances, one or more of the enumerated aspects may be omitted or performed in a different order.

At block 1510, the method 1500 includes the BS transmitting, to a UE (e.g., a narrow-band internet of things (NB-IoT) device, an enhanced machine-type communication (eMTC) device, or other wireless communication device), an indication of a plurality of paging carriers. In some instances, the indication transmitted to the UE indicates a paging coverage level for each of the plurality of paging carriers of a cell (e.g., as discussed with respect to FIGS. 3 and 5-7). In some aspects, the paging coverage level for each of the plurality of paging carriers includes one or more paging coverage levels. In some instances, the indication may include a value to indicate the one or more paging coverage levels supported by a paging carrier (e.g., as shown in FIGS. 5-7). In some instances, the indication may include a bit for each paging coverage level to indicate whether each paging coverage level is supported or not supported by the paging carrier (e.g., as shown in FIG. 6). In some instances, each paging carrier supports a single paging coverage level. In some aspects, the BS transmits the indication to the UE via a system information block (SIB) (e.g., e.g., SIB2-NB, SIB22-NB, SIB24-NB, or other suitable SIB), a downlink common configuration message, and/or a paging control channel (PCCH) configuration message.

At block 1520, the method 1500 includes the BS selecting, based on a coverage level of the UE, a paging carrier from the plurality of paging carriers. In some instances, the BS selects the paging carrier for a UE from the plurality of paging carriers by identifying a subset of the plurality of paging carriers supporting the coverage level of the UE and selecting a particular paging carrier from the subset supporting the coverage level of the UE. In some instances, the BS selects or determines the paging carrier based on a discontinuous reception (DRX) cycle of the UE. The DRX cycle of the UE may be configured or assigned by the BS. In some aspects, the BS transmits to the UE an indication of one or more DRX cycle length(s) supported by each of the plurality of paging carriers. The indication of the DRX cycle length(s) may be included as part of the indication of the plurality of paging carriers (transmitted at block 1510) or as a separate indication to the UE.

At block 1530, the method 1500 includes the BS transmitting, to the UE using the paging carrier selected from the plurality of paging carriers (at block 1520), a paging message.

In some aspects, the method 1500 includes the BS transmitting, to the UE, an indication of a coverage restriction of the UE. In some instances, the BS receives, from a core network (e.g., core network 902), a notice of the coverage restriction of the UE.

In some aspects, the method 1500 includes the BS receiving an indication the UE supports coverage-level-based paging carrier selection and transmitting, to the UE, an indication of the coverage level of the user equipment. The BS can receive the indication the UE supports coverage-level-based paging carrier selection from the UE (e.g., via an attachment request and/or TAU request) and/or a core network (e.g., via a paging request message).

Figure 16:
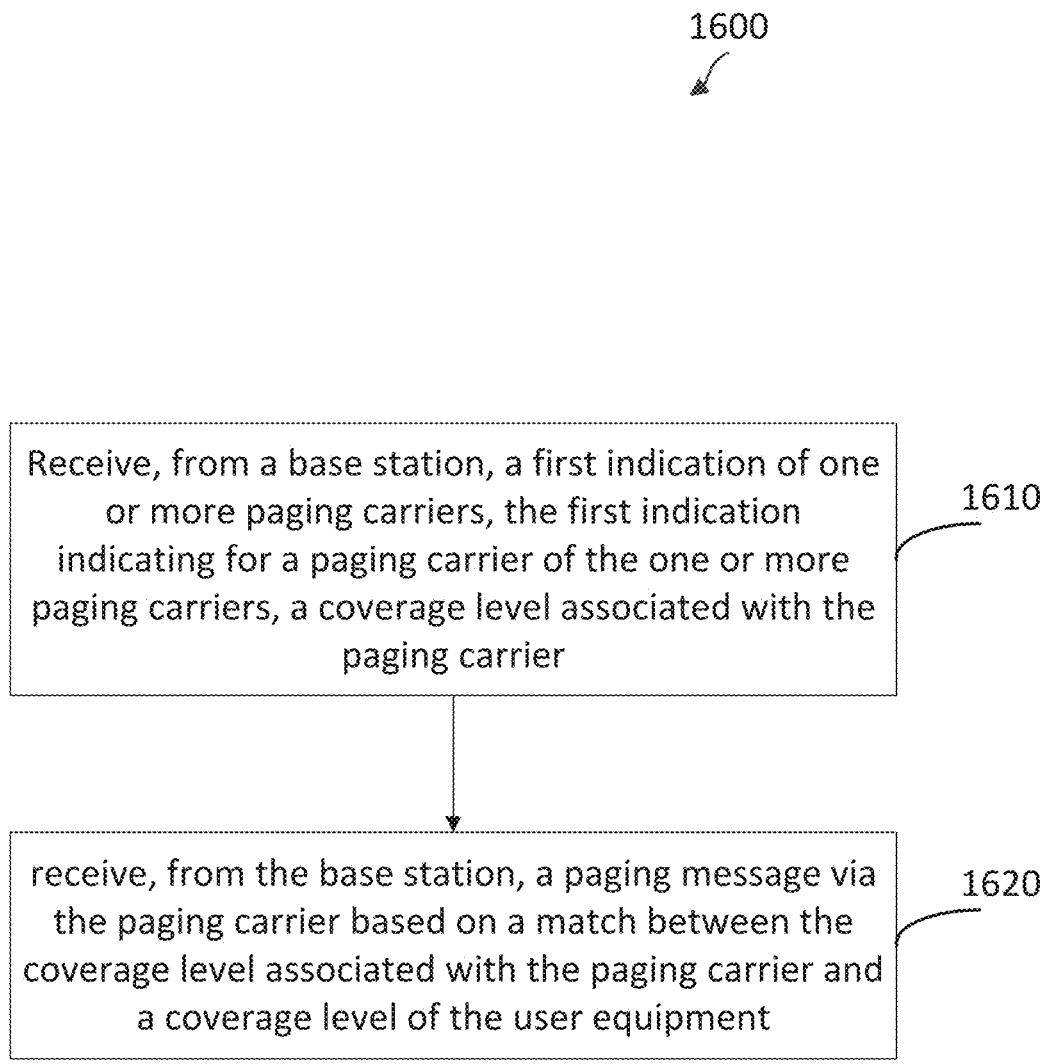
FIG. 16 is a flow diagram of a communication method according to some aspects of the present disclosure.

FIG. 16 is a flow diagram of a communication method 1600 according to some aspects of the present disclosure. Aspects of the method 1600 can be executed by a computing device (e.g., a processor, processing circuit, and/or other suitable component) of a wireless communication device or other suitable means for performing the steps. For example, a wireless communication device, such as a UE 115 or the UE 1300, may utilize one or more components, such as the processor 1302, the memory 1304, the paging module 1308, the transceiver 1310, the modem 1312, and the one or more antennas 1316, to execute the steps of method 1600. The method 1600 may employ similar mechanisms as described above in FIGS. 2-10. The method 1600 may be implemented between the UE 115, the BS 105, and/or core network 902 of FIGS. 1, 2, 9, and/or 10. As illustrated, the method 1600 includes a number of enumerated aspects, but the method 1600 may include additional aspects before, after, and in between the enumerated aspects. In some instances, one or more of the enumerated aspects may be omitted or performed in a different order.

At block 1610, the method 1600 includes the UE (e.g., a narrow-band internet of things (NB-IoT) device, an enhanced machine-type communication (eMTC) device, or other wireless communication device) receiving, from a base station, a first indication of one or more paging carriers, the first indication indicating for a paging carrier of the one or more paging carriers, a coverage level supported by the paging carrier.

At block 1620, the method 1600 includes the UE receiving, from the base station, a paging message via the paging carrier based on a match between the coverage level supported by the paging carrier and a coverage level of the user equipment.

Figure 17:
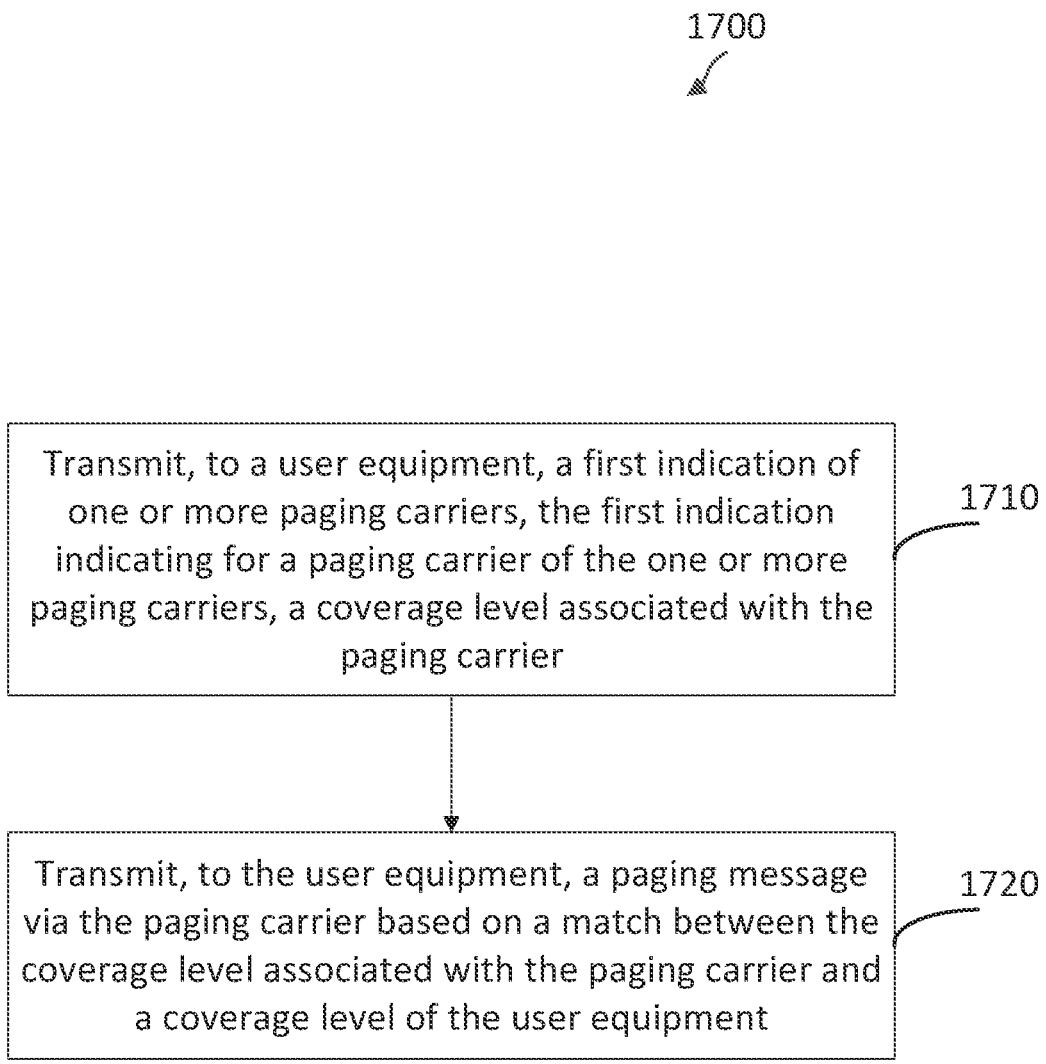
FIG. 17 is a flow diagram of a communication method according to some aspects of the present disclosure.

FIG. 17 is a flow diagram of a communication method 1700 according to some aspects of the present disclosure. Aspects of the method 1700 can be executed by a computing device (e.g., a processor, processing circuit, and/or other suitable component) of a wireless communication device or other suitable means for performing the steps. For example, a wireless communication device, such as a BS 105 or the BS 1200, may utilize one or more components, such as the processor 1202, the memory 1204, the paging module 1208, the transceiver 1210, the modem 1212, and the one or more antennas 1216, to execute the steps of method 1700. The method 1700 may employ similar mechanisms as described above in FIGS. 2-10. The method 1700 may be implemented between the UE 115, the BS 105, and/or core network 902 of FIGS. 1, 2, 9, and/or 10. As illustrated, the method 1700 includes a number of enumerated aspects, but the method 1700 may include additional aspects before, after, and in between the enumerated aspects. In some instances, one or more of the enumerated aspects may be omitted or performed in a different order.

At block 1710, the method 1700 includes a BS transmitting, to a user equipment, a first indication of one or more paging carriers, the first indication indicating for a paging carrier of the one or more paging carriers, a coverage level supported by the paging carrier.

At block 1720, the method 1700 includes the BS transmitting, to the user equipment, a paging message via the paging carrier based on a match between the coverage level supported by the paging carrier and a coverage level of the user equipment.

In some instances, the method 1600 further includes receiving, from the base station, the first indication via a system information block (SIB). Further, the method 1600 includes receiving, from the base station, the first indication via at least one of a downlink common configuration message or a paging control channel configuration message.

In some instances, the method 1700 further includes transmitting, to the user equipment, the first indication via a system information block (SIB). Further, the method 1700 includes transmitting, to the user equipment, the first indication via at least one of a downlink common configuration message or a paging control channel configuration message.

In some instances, each paging carrier of the plurality of paging carriers supports a single paging coverage level.

In some instances, the coverage level of the user equipment is based on a narrow-band physical random access channel (NPRACH) threshold and a reference signal receive power (RSRP). In some instances, the coverage level of the user equipment is based on a physical random access channel (PRACH) threshold and a reference signal receive power (RSRP). In some instances, the coverage level of the user equipment is based on a paging threshold and a reference signal receive power (RSRP). In some instances, the coverage level of the user equipment is based on a coverage restriction of the user equipment.

In some instances, the method 1600 further includes transmitting, to the base station, a second indication indicating that the user equipment supports paging carrier selection based on coverage level; and receiving, from the base station, a third indication indicating the coverage level of the user equipment.

In some instances, the method 1700 further includes receiving, from the user equipment, a second indication indicating that the user equipment supports paging carrier selection based on coverage level; and transmitting, to the user equipment, a third indication indicating the coverage level of the user equipment.

In some instances, the paging carrier is one of a subset of the plurality of paging carriers supporting the coverage level of the user equipment. In some instances, the method 1600 further includes selecting the paging carrier from the subset of the plurality of paging carriers supporting the coverage level of the user equipment based on a discontinuous reception (DRX) cycle of the user equipment. In some instances, the indication indicates a DRX cycle length for each of the plurality of paging carriers.

In some instances, the user equipment is a narrow-band internet of things (NB-IoT) device or an enhanced machine-type communication (eMTC) device.

Recitations of Various Aspects of the Present Disclosure

Aspect 1: A method of wireless communication performed by a user equipment, the method comprising: receiving, from a base station, an indication of a plurality of paging carriers; selecting, based on a coverage level of the user equipment, a paging carrier from the plurality of paging carriers; and monitoring, the paging carrier selected from the plurality of paging carriers, for a paging message from the base station.

Aspect 2: The method of aspect 1, wherein the receiving the indication comprises: receiving, from the base station, the indication indicating a paging coverage level for each of the plurality of paging carriers.

Aspect 3: The method of aspect 1 or 2, wherein the receiving the indication further comprises: receiving, from the base station, the indication via a system information block (SIB).

Aspect 4: The method of aspect 2 or 3, wherein the paging coverage level for each of the plurality of paging carriers includes one or more paging coverage levels.

Aspect 5: The method of aspect 4, wherein the indication includes a value to indicate the one or more paging coverage levels supported.

Aspect 6: The method of aspect 4 or 5, wherein the indication includes a bit for each paging coverage level to indicate whether each paging coverage level is supported or not supported.

Aspect 7: The method of any of aspects 1-6, wherein the receiving the indication further comprises: receiving, from the base station, the indication via at least one of a downlink common configuration message or a paging control channel configuration message.

Aspect 8: The method of any of aspects 1-7, wherein each paging carrier of the plurality of paging carriers supports a single paging coverage level.

Aspect 9: The method of any of aspects 1-8, further comprising: determining the coverage level of the user equipment.

Aspect 10: The method of aspect 9, wherein the determining the coverage level comprises: determining the coverage level based on a narrow-band physical random access channel (NPRACH) threshold and a reference signal receive power (RSRP).

Aspect 11: The method of aspect 9 or 10, wherein the determining the coverage level comprises: determining the coverage level based on a physical random access channel (PRACH) threshold and a reference signal receive power (RSRP).

Aspect 12: The method of any of aspects 9-11, wherein the determining the coverage level comprises: determining the coverage level based on a paging threshold and a reference signal receive power (RSRP).

Aspect 13: The method of any of aspects 9-12, wherein the determining the coverage level comprises: determining the coverage level based on a coverage restriction of the user equipment.

Aspect 14: The method of any of aspects 1-13, further comprising: transmitting, to a network, an indication the user equipment supports paging carrier selection based on coverage level; and receiving, from the network, an indication of the coverage level of the user equipment.

Aspect 15: The method of any of aspects 1-14, wherein the selecting the paging carrier from the plurality of paging carriers comprises: identifying a subset of the plurality of paging carriers supporting the coverage level of the user equipment; and selecting the paging carrier from the subset of the plurality of paging carriers supporting the coverage level of the user equipment.

Aspect 16: The method of aspect 15, wherein the selecting the paging carrier from the plurality of paging carriers further comprises: selecting the paging carrier from the subset of the plurality of paging carriers supporting the coverage level of the user equipment based on a discontinuous reception (DRX) cycle of the user equipment.

Aspect 17: The method of aspect 16, wherein the receiving the indication of the plurality of paging carriers comprises: receiving, from the base station, the indication indicating a DRX cycle length for each of the plurality of paging carriers.

Aspect 18: The method of any of aspects 1-17, wherein the user equipment is a narrow-band internet of things (NB-IoT) device.

Aspect 19: The method of any of aspects 1-18, wherein the user equipment is an enhanced machine-type communication (eMTC) device.

Aspect 20: A method of wireless communication performed by a base station, the method comprising: transmitting, to a user equipment, an indication of a plurality of paging carriers; selecting, based on a coverage level of the user equipment, a paging carrier from the plurality of paging carriers; and transmitting, to the user equipment using the paging carrier selected from the plurality of paging carriers, a paging message.

Aspect 21: The method of aspect 20, wherein the transmitting the indication comprises: transmitting, to the user equipment, the indication indicating a paging coverage level for each of the plurality of paging carriers.

Aspect 22: The method of aspect 21, wherein the transmitting the indication further comprises: transmitting, to the user equipment, the indication via a system information block (SIB).

Aspect 23: The method of 21 or 22, wherein the paging coverage level for each of the plurality of paging carriers includes one or more paging coverage levels.

Aspect 24: The method of aspect 23, wherein the indication includes a value to indicate the one or more paging coverage levels supported.

Aspect 25: The method of aspect 23 or 24, wherein the indication includes a bit for each paging coverage level to indicate whether each paging coverage level is supported or not supported.

Aspect 26: The method of any of aspects 21-25, wherein each paging carrier of the plurality of paging carriers supports a single paging coverage level.

Aspect 27: The method of any of aspects 21-26, wherein the transmitting the indication further comprises: transmitting, to the user equipment, the indication via at least one of a downlink common configuration message or a paging control channel configuration message.

Aspect 28: The method of any of aspects 21-27, further comprising: transmitting, to the user equipment, an indication of a coverage restriction of the user equipment.

Aspect 29: The method of aspect 28, further comprising: receiving, from a core network, a notice of the coverage restriction of the user equipment.

Aspect 30: The method of any of aspects 20-29, further comprising: receiving an indication the user equipment supports paging carrier selection based on coverage level; and transmitting, to the user equipment, an indication of the coverage level of the user equipment.

Aspect 31: The method of aspect 30, wherein the receiving the indication comprises: receiving the indication from the user equipment.

Aspect 32: The method of aspect 30 or 31, wherein the receiving the indication comprises: receiving the indication from a core network.

Aspect 33: The method of any of aspects 30-32, wherein the receiving the indication further comprises: receiving the indication via a paging request message from the core network.

Aspect 34: The method of any of aspects 20-33, wherein the selecting the paging carrier from the plurality of paging carriers comprises: identifying a subset of the plurality of paging carriers supporting the coverage level of the user equipment; and selecting the paging carrier from the subset of the plurality of paging carriers supporting the coverage level of the user equipment.

Aspect 35: The method of aspect 34, wherein the selecting the paging carrier from the plurality of paging carriers further comprises: selecting the paging carrier from the subset of the plurality of paging carriers supporting the coverage level of the user equipment based on a discontinuous reception (DRX) cycle of the user equipment.

Aspect 36: The method of aspect 35, wherein the transmitting the indication of the plurality of paging carriers comprises: transmitting, to the user equipment, the indication indicating a DRX cycle length for each of the plurality of paging carriers.

Aspect 37: A user equipment (UE), comprising: a memory; a processor coupled to the memory; and a transceiver coupled to the processor, the UE configured to perform the methods of aspects 1-19.

Aspect 38: A base station (BS), comprising: a memory; a processor coupled to the memory; and a transceiver coupled to the processor, the BS configured to perform the methods of aspects 20-36.

Aspect 39: A user equipment (UE) comprising means for performing the methods of aspects 1-19.

Aspect 40: A base station (BS) comprising means for performing the methods of aspects 20-36.

Aspect 41: A non-transitory computer-readable medium (CRM) having program code recorded thereon, the program code comprises code for causing a user equipment (UE) to perform the methods of aspects 1-19.

Aspect 42: A non-transitory computer-readable medium (CRM) having program code recorded thereon, the program code comprises code for causing a base station (BS) to perform the methods of aspects 20-36.

Aspect 43: A method of wireless communication, the method comprising: receiving, from a base station, a first indication of one or more paging carriers, the first indication indicating for a paging carrier of the one or more paging carriers, a coverage level supported by the paging carrier; and receiving, from the base station, a paging message via the paging carrier based on a match between the coverage level supported by the paging carrier and a coverage level of the user equipment.

Aspect 44: The method of aspect 43, further comprising: receiving, from the base station, the first indication via a system information block (SIB).

Aspect 45: The method of aspect 43 or 44, further comprising: receiving, from the base station, the first indication via at least one of a downlink common configuration message or a paging control channel configuration message.

Aspect 46: The method of any of aspects 43-45, wherein each paging carrier of the plurality of paging carriers supports a single paging coverage level.

Aspect 47: The method of any of aspects 43-46, wherein the coverage level of the user equipment is based on a narrow-band physical random access channel (NPRACH) threshold and a reference signal receive power (RSRP).

Aspect 48: The method of any of aspects 43-47, wherein the coverage level of the user equipment is based on a physical random access channel (PRACH) threshold and a reference signal receive power (RSRP).

Aspect 49: The method of any of aspects 43-48, wherein the coverage level of the user equipment is based on a paging threshold and a reference signal receive power (RSRP).

Aspect 50: The method of any of aspects 43-49, wherein the coverage level of the user equipment is based on a coverage restriction of the user equipment.

Aspect 51: The method of any of aspects 43-50, further comprising: transmitting, to the base station, a second indication indicating that the user equipment supports paging carrier selection based on coverage level; and receiving, from the base station, a third indication indicating the coverage level of the user equipment.

Aspect 52: The method of any of aspects 43-51, wherein the paging carrier is one of a subset of the plurality of paging carriers supporting the coverage level of the user equipment.

Aspect 53: The method of aspect 52, further comprising: selecting the paging carrier from the subset of the plurality of paging carriers supporting the coverage level of the user equipment based on a discontinuous reception (DRX) cycle of the user equipment.

Aspect 54: The method of aspect 53, wherein the indication indicates a DRX cycle length for each of the plurality of paging carriers.

Aspect 55: The method of any of aspects 43-54, wherein the user equipment is a narrow-band internet of things (NB-IoT) device or an enhanced machine-type communication (eMTC) device.

Aspect 56: A user equipment (UE), comprising: a processor; and a transceiver coupled to the processor, the UE configured to perform the methods of aspects 43-55.

Aspect 57: A user equipment (UE) comprising means for performing the methods of aspects 43-55.

Aspect 58: A non-transitory computer-readable medium (CRM) having program code recorded thereon, the program code comprises code for causing a user equipment (UE) to perform the methods of aspects 43-55.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed at a user equipment (UE), the method comprising:
   outputting, for transmission, a mobility management request indicating that the UE supports coverage-level-based paging carrier selection;
   obtaining, based on the mobility management request, a first system information block (SIB) indicating one or more coverage levels the UE is authorized to use;
   obtaining, based on the mobility management request, a second SIB indicating a plurality of paging carriers, a discontinuous reception (DRX) cycle length for each of the plurality of paging carriers, and one or more coverage levels supported by the plurality of paging carriers;
   selecting a first paging carrier from a subset of one or more paging carriers based on:
      the one or more coverage levels indicated in the first SIB,
      the plurality of paging carriers indicated in the second SIB,
      a DRX cycle of the UE, and
      the DRX cycle length for each of the plurality of paging carriers in the second SIB,
      wherein the first paging carrier is associated with a first coverage level of the one or more coverage levels indicated in the first SIB, wherein the subset supports the first coverage level; and
   obtaining a paging message via the first paging carrier based on the first coverage level.

2. The method of claim 1, wherein each paging carrier of the plurality of paging carriers supports a single paging coverage level.

3. The method of claim 1, wherein the first coverage level is based on a narrow-band physical random access channel (NPRACH) threshold and a reference signal receive power (RSRP).

4. The method of claim 1, wherein the first coverage level is based on a physical random access channel (PRACH) threshold and a reference signal receive power (RSRP).

5. The method of claim 1, wherein the first coverage level is based on a paging threshold and a reference signal receive power (RSRP).

6. The method of claim 1, wherein the first coverage level is based on a coverage restriction of the user equipment.

7. The method of claim 1, further comprising:
   obtaining a first indication indicating the first coverage level.

8. The method of claim 1, wherein the first paging carrier is one of a subset of the plurality of paging carriers supporting the first coverage level.

9. The method of claim 1, wherein the user equipment is a narrow-band internet of things (NB-IoT) device or an enhanced machine-type communication (eMTC) device.

10. A user equipment (UE), comprising:
    at least one transceiver;
    at least one memory device comprising instructions; and
    at least one processor configured to execute the instructions and cause the UE to:
       transmit a mobility management request indicating that the UE supports coverage-level-based paging carrier selection;
       receive, based on the mobility management request, a first system information block (SIB) indicating one or more coverage levels the UE is authorized to use;
       receive a second SIB indicating a plurality of paging carriers, a discontinuous reception (DRX) cycle length for each of the plurality of paging carriers, and one or more coverage levels supported by the plurality of paging carriers;
       select a first paging carrier from a subset of one or more paging carriers based on:
          the one or more coverage levels indicated in the first SIB,
          the plurality of paging carriers indicated in the second SIB,
          a DRX cycle of the UE, and
          the DRX cycle length for each of the plurality of paging carriers in the second SIB,
          wherein the first paging carrier is associated with a first coverage level, wherein the subset supports the first coverage level; and
       obtain receive a paging message via the first paging carrier based on the first coverage level.

11. The UE of claim 10, wherein each paging carrier of the plurality of paging carriers supports a single paging coverage level.

12. The UE of claim 10, wherein the first coverage level is based on a narrow-band physical random access channel (NPRACH) threshold and a reference signal receive power (RSRP).

13. The UE of claim 10, wherein the first coverage level is based on a physical random access channel (PRACH) threshold and a reference signal receive power (RSRP).

14. The UE of claim 10, wherein the first coverage level is based on a paging threshold and a reference signal receive power (RSRP).

15. The UE of claim 10, wherein the first coverage level is based on a coverage restriction of the UE.

16. The UE of claim 10, wherein the transceiver UE is further configured to:
    obtain, from the base station, a first indication indicating the first coverage level.

17. The UE of claim 10, wherein the first paging carrier is one of a subset of the plurality of paging carriers supporting the first coverage level.

18. The UE of claim 10, wherein the UE is a narrow-band internet of things (NB-IoT) device or an enhanced machine-type communication (eMTC) device.

* * * * *